(12) United States Patent
Zhou et al.

(10) Patent No.: US 8,613,821 B2
(45) Date of Patent: Dec. 24, 2013

(54) BASIC METAL NITRATE, PROCESS FOR PRODUCING THE SAME AND GAS GENERATING AGENT COMPOSITION

(75) Inventors: Xingxi Zhou, Himeji (JP); Kazuyuki Matsuoka, Kitakatsuragi-gun (JP); Jianzhou Wu, Himeji (JP); Yo Yamato, Himeji (JP); Takeshi Takahori, Himeji (JP); Kaoru Yamazaki, Himeji (JP)

(73) Assignee: Daicel Chemical Industries, Ltd., Osaka-Shi (JP)

(*) Notice: Subject to any disclaimer, the term of this patent is extended or adjusted under 35 U.S.C. 154(b) by 16 days.

(21) Appl. No.: 12/877,632

(22) Filed: Sep. 8, 2010

(65) Prior Publication Data

US 2010/0326574 A1    Dec. 30, 2010

Related U.S. Application Data

(60) Division of application No. 12/205,393, filed on Sep. 5, 2008, now abandoned, which is a continuation of application No. 09/914,548, filed as application No. PCT/JP00/06664 on Sep. 27, 2000, now abandoned.

(30) Foreign Application Priority Data

| Sep. 27, 1999 | (JP) | 11-271976 |
| Oct. 8, 1999 | (JP) | 11-287507 |
| Mar. 15, 2000 | (JP) | 2000-071680 |
| Mar. 15, 2000 | (JP) | 2000-071753 |
| Apr. 27, 2000 | (JP) | 2000-128077 |
| Sep. 18, 2000 | (JP) | 2000-281421 |
| Sep. 19, 2000 | (JP) | 2000-282972 |

(51) Int. Cl.
| C06B 45/00 | (2006.01) |
| C06B 45/04 | (2006.01) |
| C06B 45/10 | (2006.01) |
| C06B 25/00 | (2006.01) |
| C06B 25/34 | (2006.01) |
| D03D 23/00 | (2006.01) |
| D03D 43/00 | (2006.01) |

(52) U.S. Cl.
USPC ............... 149/19.7; 149/2; 149/17; 149/88; 149/92; 149/109.2

(58) Field of Classification Search
USPC ............... 149/19.7, 19, 2, 17, 88, 92, 109.2
See application file for complete search history.

(56) References Cited

U.S. PATENT DOCUMENTS 3,902,934 A * 9/1975 Timmerman ............... 149/83
4,369,079 A   1/1983 Shaw
(Continued)

FOREIGN PATENT DOCUMENTS

| DE | 298 06 504 U1 | 9/1998 | |
| DE | 102 30 402 A1 * | 1/2004 | ............... C06D 5/06 |

(Continued)

OTHER PUBLICATIONS

English language translation of JP H11-298989 dated Jan. 21, 2003.

(Continued)

*Primary Examiner* — James McDonough
(74) *Attorney, Agent, or Firm* — Birch, Stewart, Kolasch & Birch, LLP

(57) ABSTRACT

Provided is a basic metal nitrate suitable as an oxidizing agent for a gas generating agent, which is a basic metal nitrate having a good thermal stability and meeting at least one requirement of the following (a) to (d):

(a) a particle diameter of 0.5 to 40 μm; (b) a degree of crystallinity having 0.4 deg or less of a half band width of the peak in the X-ray analysis; (c) an initiation temperature of weight loss being 220° C. or higher according to TG-DTA analysis; and (d) an impurity content of 1,000 ppm or less based on Na atom. Further provided is a gas generating composition which has a low toxicity, a high burning rate and a low combustion temperature and which is used in a gas generator for an air bag. The gas generating composition comprises (a) tetrazole derivatives, guanidine derivatives or a mixture thereof, (b) a basic metal nitrate and (c) a binder and/or a slag-forming agent.

2 Claims, 7 Drawing Sheets

(56) References Cited

U.S. PATENT DOCUMENTS

| | | | |
|---|---|---|---|
| 4,909,549 A | 3/1990 | Poole et al. | |
| 4,994,212 A | 2/1991 | Vos et al. | |
| 5,084,218 A | 1/1992 | Vos et al. | |
| 5,500,059 A | 3/1996 | Lund et al. | |
| 5,542,998 A | 8/1996 | Bucerius | |
| 5,542,999 A | 8/1996 | Bucerius et al. | |
| 5,608,183 A | 3/1997 | Barnes et al. | |
| 5,725,669 A | 3/1998 | Heckmann | |
| 5,735,118 A | 4/1998 | Hinshaw et al. | |
| 5,780,767 A | 7/1998 | Matsuda et al. | |
| 5,834,679 A | 11/1998 | Seeger | |
| 5,841,065 A * | 11/1998 | Mendenhall | 149/37 |
| 5,931,496 A * | 8/1999 | Brede et al. | 280/741 |
| 6,039,820 A | 3/2000 | Hinshaw et al. | |
| 6,077,372 A | 6/2000 | Mendenhall et al. | |
| 6,096,147 A | 8/2000 | Taylor et al. | |
| 6,132,537 A | 10/2000 | Zeuner et al. | |
| 6,143,102 A | 11/2000 | Mendenhall et al. | |
| 6,412,815 B1 | 7/2002 | Nakashima et al. | |
| 6,468,369 B1 | 10/2002 | Zhou | |
| 6,488,310 B1 | 12/2002 | Ryobo et al. | |
| 6,505,562 B1 | 1/2003 | Wu | |
| 6,533,878 B1 * | 3/2003 | Fonblanc | 149/76 |
| 6,682,616 B1 * | 1/2004 | Yamato et al. | 149/45 |
| 2003/0042718 A1 * | 3/2003 | Katsuda et al. | 280/736 |

FOREIGN PATENT DOCUMENTS

| | | |
|---|---|---|
| EP | 1 205 457 | 5/2002 |
| FR | 2-772370 | 6/1999 |
| JP | 2-145422 | 6/1990 |
| JP | 5-330877 | 12/1993 |
| JP | 10-72273 | 3/1998 |
| JP | 10-87390 | 4/1998 |
| JP | 10-265290 A | 10/1998 |
| JP | 11-502864 | 3/1999 |
| JP | 11-125012 | 5/1999 |
| JP | 11-510779 | 9/1999 |
| JP | 11-343192 | 12/1999 |
| WO | WO 95/04672 A1 | 2/1995 |
| WO | WO 97/04860 | 2/1997 |
| WO | WO 97/16397 | 5/1997 |
| WO | WO 99/31029 | 6/1999 |

OTHER PUBLICATIONS

H. Tanaka et al., "Preparation and Thermal Decompostion of Synthetic Gerhardtite Cu2(OH)3NO3", Journal of Thermal Analysis, vol. 39 (1993), pp. 1011-1018.

Appeal Brief in Opposition to EP 1 241 138, filed by Nippon Kayaku Co., Ltd. on Apr. 4, 2012.

Beck et al., "Brenn- and Explosionskenngroessen von Staeuben, "BIA-Report 12/97, published by HVBG, Nov. 1997, including English abstract.

Beck et al., "Combustion and Explosion Characteristics of Dusts", BIA-Report 13/97, published by HVBG, Nov. 1997.

Markus Bogdan, Declaration in support of Apr. 4, 2012 Appeal Brief in Opposition to EP 1 241 138, executed Mar. 13, 2012.

W. Wiemann, VDI-Berichte, 494:89-97, 1984.

* cited by examiner

BASIC METAL NITRATE, PROCESS FOR PRODUCING THE SAME AND GAS GENERATING AGENT COMPOSITION

This application is a divisional of application Ser. No. 12/205,393, filed on Sep. 5, 2008 now abandoned. Application Ser. No. 12/205,393 was a continuation of application Ser. No. 09/914,548, filed Aug. 30, 2001, now abandoned which was the national phase under 35 U.S.C. §371 of International Application No. PCT/JP00/06664, filed on Sep. 27, 2000. This application claims priority under 35 U.S.C. §120 to the foregoing applications. This application also claims priority under 35 U.S.C. §119 to Applications Nos. 11-271976; 11-287507; 2000-71680; 2000-71753; 2000-128077; 2000-281421; and 2000-282972, filed in Japan respectively on Sep. 27, 1999; Oct. 8, 1999; Mar. 15, 2000; Mar. 15, 2000; Apr. 27, 2000; Sep. 18, 2000; and Sep. 19, 2000. The entire contents of the above-identified applications are hereby incorporated by reference.

TECHNICAL FIELD TO WHICH THE INVENTION BELONGS

The present invention relates to a novel basic metal nitrate, a process for producing the same, a gas generating composition, its molded article and a gas generator for an air bag using the gas generating composition. It is suitable for an air bag restraining system of automobiles or the like.

RELATED ART

As a gas generating agent for an air bag as a passenger-protecting device in automobiles, a composition using sodium azide has been often used so far. However, a toxicity [$LD_{50}$ (oral-rat)=27 mg/kg] to human bodies or hazards in handling of sodium azide has been regarded as a serious problem. Therefore, as safe non-azide based gas generating compositions, gas generating compositions containing various nitrogen-containing organic compounds have been developed to replace the above conventional composition.

For example, U.S. Pat. No. 4,909,549 discloses a composition comprising hydrogen-containing tetrazole and triazole compounds and an oxygen-containing oxidizing agent. U.S. Pat. No. 4,370,181 discloses a gas generating composition comprising a hydrogen-free bitetrazole metal salt and an oxygen-free oxidizing agent. U.S. Pat. No. 4,369,079 discloses a gas generating composition comprising a hydrogen-free bitetrazole metal salt, an alkali metal nitrate, an alkali metal nitrite, an alkaline earth metal nitrate, an alkaline earth metal nitrite or a mixture thereof. U.S. Pat. No. 5,542,999 discloses a gas generating composition comprising a fuel such as GZT, TAGN, NG (nitroguanidine), NTO or the like, a basic copper nitrate, a catalyst for reducing toxic gases and a coolant agent. JP-A 10-72273 discloses a gas generating composition comprising a bitetrazole metal salt, a bitetrazole ammonium salt or aminotetrazole and ammonium nitrate.

However, the above non-azide based gas generating composition is problematic in a combustion temperature, a burning rate, phase transfer, amounts of carbon monoxide and nitrogen oxides generated, a gas output and the like. For example, the gas generating composition of U.S. Pat. No. 4,369,079 has a high combustion temperature, and requires a large amount of a coolant in actual use. The composition of U.S. Pat. No. 5,542,999 has a low burning rate, and might not be completely burned in a short time. In the gas generating agent of JP-A 10-72273, a shape is changed due to phase transfer of ammonium nitrate in the range of the use temperature, which damages a molded article of the gas generating agent, and in result, stable combustion cannot be obtained.

Further, JP-A 9-328389 discloses a gas generating composition comprising a fuel and an oxidizing agent, 60 to 100% by weight of the fuel being polyamine nitrates represented by the formulas (I) to (III) and the balance of an alkyldiamine having 2 or 3 carbon atoms, and the oxidizing agent being a copper compound. In this related art, effects such as a high gas yield and the like are obtained only by using the polyamine nitrates as an essential component of the fuel.

Still further, JP-A 11-343192 discloses a gas generating composition comprising a fuel mixture comprising at least two components and an oxidizing agent mixture comprising at least three components, wherein the fuel mixture contains a guanidine compound and a heterocyclic organic acid as essential components, and the oxidizing agent mixture contains a transition metal oxide, a basic copper nitrate and a metal chlorate, a metal perchlorate, ammonium perchlorate, an alkali metal nitrate, an alkaline earth metal nitrate or a mixture thereof as essential components. In this related art, the satisfactory effects in an ignitability and a burning rate are obtained only by the combination of the fuel mixture of at least two components and the oxidizing agent mixture of at least three components.

Furthermore, U.S. Pat. No. 5,542,998 discloses a gas generating mixture comprising a fuel, an oxidizing agent and a catalyst, the oxidizing agent being a basic copper nitrate, and the catalyst being a metal oxide. It describes that a coolant agent can be used as an optional component and a slag-forming agent is unnecessary. U.S. Pat. No. 5,542,999 discloses a gas generating mixture comprising a fuel, an oxidizing agent and a catalyst, the oxidizing agent being a basic copper nitrate, and the catalyst being a supported metal or metal alloy. It describes that a coolant agent can be used as an optional component and a slag-forming agent is unnecessary.

Since both of these two related art use the metallic catalyst as an essential component, the production cost is high. In comparison with a catalyst-free gas generating agent, when the same gas output is secured, the weight is increased. Meanwhile, when the weight is decreased, the gas output is decreased. Thus, this is not practical at present especially because downsizing of a gas generator is in high demand.

Moreover, FR-C 2,772,370 discloses a pyrotechnic gas generating composition comprising, as essential components, a crosslinked reducing binder selected from the group consisting of a silicone resin, an epoxy resin and a polyacrylic rubber, an additive comprising a mixture of a copper compound and an organic nitrogen-containing compound and a main oxidizing agent containing a mixture of ammonium perchlorate and a chlorine scavenger. This related art can improve an ignitability and the like only by such a composition.

In addition, for a non-azide based gas generating agent, physical and chemical interactions are exerted in some combination of a fuel and an oxidizing agent over a long period of time. Consequently, problems arise such that a fuel component is gradually decomposed and a thermal decomposition temperature of the fuel becomes lower than an originally designed temperature. When the thermal decomposition temperature of the fuel is thus decreased, the gas generating agent is sometimes degraded during a long term. Accordingly, a gas generating agent having a high storage stability with less decomposition of a fuel has been in demand.

DISCLOSURE OF THE INVENTION

A object of the invention is to provide a basic metal nitrate which can provide a gas generating agent having a high process for producing the same.

Another object of the invention is to provide a gas generating composition which is high in storage stability before actuation, as well as in safety at the time of handling, and that has, during actuation, a low combustion temperature, a high burning rate, small amounts of carbon monoxide and nitrogen oxides formed and good combustion stability.

Still another object of the invention is to provide a gas generator for an air bag using the gas generating composition.

The object of the invention is to provide a gas generating composition which is different in formulation from the compositions of the related art, and that has a low combustion temperature, a high burning rate, small amounts of carbon monoxide and nitrogen oxides generated and good combustion stability, its molded article and a gas generator for an air bag using the same.

The invention provides basic metal nitrates (BCN) specified below, a process specified below, and basic metal nitrates obtained by the process. These basic metal nitrates provide gas generating compositions by being used along with other components of a gas generating agent exemplified in the invention.

The invention provides a gas generating composition comprising a basic metal nitrate. This composition preferably comprises a basic metal nitrate (BCN) specified below and a basic metal nitrate obtained by a process specified below.

The invention provides a basic metal nitrate meeting at least one requirement of the following (a) to (d):

(a) a particle diameter of 0.5 to 40 μm;

(b) a degree of crystallinity having 0.35 deg or less of a half band width in the peak of the X-ray diffraction;

(c) an initiation temperature of weight loss being 220° C. or higher according to TG-DTA analysis; and (d) an impurity content of 1,000 ppm or less based on Na atom.

The basic metal nitrate of the invention is excellent in thermal stability.

Further, the invention provides a process for producing a basic metal nitrate by reacting a metal nitrate with an alkali metal bicarbonate.

Still further, the invention provides a gas generating composition comprising a fuel and a basic metal nitrate, the basic metal nitrate meeting at least one requirement selected from the following (a-1) to (a-3):

(a-1) a particle diameter of 0.5 to 40 μM;

(a-2) a specific surface area of particles being 0.4 to 6.0 $m^2/g$; and (a-3) a bulk density of particles being 0.4 g/ml or more.

Furthermore, the invention provides a gas generating composition comprising a fuel and a basic metal nitrate, the basic metal nitrate being in the form of secondary particles of coagulated principal particles, and the secondary particles meeting at least one requirement selected from the following (a-1) to (a-3):

(a-1) a particle diameter of 0.5 to 40 μm;

(a-2) a specific surface area of particles being 0.4 to 6.0 $m^2/g$; and (a-3) a bulk density of particles being 0.4 g/ml or more.

Moreover, the invention provides an inflator for an air bag using the above gas generating composition.

Incidentally, the measuring conditions of requirements (a) to (d) and (a-1) to (a-3) are described in Examples.

The basic metal nitrate in the invention includes compounds represented by the following formula. Further, some compounds are hydrates thereof. In the formula, M represents a metal, x' represents the number of metals, y and y' each represent the number of $NO_3$ ions, z' represents the number of OH ions, and n presents a ratio of an $M(OH)_z$ moiety to an $M(NO_3)_y$ moiety.

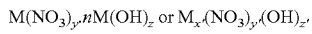

Examples of the compounds corresponding to the formula include compounds containing, as a metal M, copper, cobalt, zinc, manganese, iron, molybdenum, bismuth and cerium, such as $Cu_2(NO_3)(OH)_3$, $Cu_3(NO_3)(OH)_5.2H_2O$, $Co_2(NO_3)(OH)_3$, $Zn_2(NO_3)(OH)_3$, $Mn(NO_3)(OH)_2$, $Fe_4(NO_3)(OH)_{11}.2H_2O$, $Bi(NO_3)(OH)_2$ and $Ce(NO_3)_3(OH).3H_2O$.

As the basic metal nitrate, at least one selected from the group consisting of a basic copper nitrate (BCN), a basic cobalt nitrate, a basic zinc nitrate, a basic manganese nitrate, a basic iron nitrate, a basic molybdenum nitrate, a basic bismuth nitrate and a basic cerium nitrate is proposed. Of these, a basic copper nitrate is preferable.

The invention provides, as one means for solution, a gas generating composition comprising (a) tetrazole derivatives, or, at least one guanidine derivative selected from the group consisting of, guanidine, guanidine carbonate, nitro guanidine, dicyandiamide, nitro amino guanidine and nitro amino guanidine nitrate and (b) a basic metal nitrate.

The invention provides, as another means for solution, a gas generating composition comprising (a) tetrazole derivatives, or, at least one guanidine derivative selected from the group consisting of, guanidine, guanidine carbonate, nitro guanidine, dicyandiamide, nitro amino guanidine and nitro amino guanidine nitrate, (b) a basic metal nitrate and (c) a binder and/or a slag-forming agent.

The invention provides, as still another means for solution, a gas generating composition comprising (a) tetrazole derivatives, guanidine derivatives or a mixture thereof, (b) a basic metal nitrate and (d) a combustion-improving agent.

The invention provides, as the other means for solution, a gas generating composition comprising (a) tetrazole derivatives, guanidine derivatives or a mixture thereof, (b) a basic metal nitrate, (c) a binder and/or a slag-forming agent and (d) a combustion-improving agent.

The invention provides, as the other means for solution, a gas generating composition comprising (a) tetrazole derivatives, guanidine derivatives or a mixture thereof and (b) a basic metal nitrate, and meeting at least one requirement selected from the following (1) to (3):

(1) a weight loss ratio of the gas generating composition when the gas generating composition is retained in a closed state at 90° C. for 1,000 hours or at 110° C. for 400 hours is 2.0% or less, (2) concentrations of trace gases contained in a gas generated by the combustion of the gas generating composition, as values measured in a 2,800-liter tank, 400 ppm or less for CO, 40 ppm or less for NO, 8 ppm or less for $NO_2$ and 100 ppm or less for $NH_3$, and (3) a maximum internal pressure in a gas generator on the combustion of the gas generating composition is 7,840 to 22,500 kPa.

Further, the invention provides a gas generating composition comprising (a) tetrazole derivatives, guanidine derivatives or a mixture thereof, (b) a basic metal nitrate and (c) a binder and/or a slag-forming agent, and meeting at least one requirement of the following (1) to (3):

(1) a weight loss ratio of the gas generating composition when the gas generating composition is retained in a closed state at 90° C. for 1,000 hours or at 110° C. for 400 hours is 2.0% or less, (2) concentrations of trace gases contained in a gas generated by the combustion of the gas generating composition, as values measured in a 2,800-liter tank, 400 ppm or less for CO, 40 ppm or less for NO, 8 ppm or less for $NO_2$ and 100 ppm or less for $NH_3$, and (3) a maximum internal pressure in a gas generator on the combustion of the gas generating composition is 7,840 to 22,500 kPa.

Still further, the invention provides a molded article in the form of a single-perforated cylinder, a perforated (porous) cylinder or pellets, the molded article being obtained from the gas generating composition.

Furthermore, the invention provides an inflator for an air bag using the gas generating composition and the molded article. By the way, the "inflator" in the invention means a pyrotechnic inflator in which a gas is supplied only from a gas generating agent and a hybrid inflator in which a gas is supplied from both a compressed gas such as argon or the like and a gas generating agent (provided a portion having a function to generate a gas by burning the gas generating agent is a "gas generator").

The basic metal nitrate of the invention has a high thermal stability. Accordingly, even when the basic metal nitrate is allowed to stand in a high-temperature atmosphere for a long period of time (for example, ten to ten-odd years), degeneration such as decomposition or the like does not occur. Therefore, it is suitable as an oxidizing agent of a gas generating agent used in an air bag inflator as a safety device of automobiles in particular, or the like.

The basic metal nitrate of the invention suppresses physical and chemical interactions in combination with a fuel component, especially guanidine derivatives such as nitroguanidine and the like, making it possible to prevent the decrease in thermal stability by the decrease in decomposition temperature of the fuel component.

The process of the invention can industrially produce a basic metal nitrate such as a basic copper nitrate or the like under easily controllable reaction conditions using starting materials less costly and easily available industrially without the need of a special reaction equipment.

When the gas generating composition of the invention is used in various inflators, a high reliability can be maintained for a long period of time because of the excellent thermal stability.

The gas generating composition and its molded article of the invention are easy to handle because they have a low toxicity and are less dangerous. Further, they have a high burning rate and a low combustion temperature, and the amounts of carbon monoxide and nitrogen oxides generated in the combustion are small.

EMBODIMENT 1 OF THE INVENTION

The basic metal nitrate having the good thermal stability in the invention meets at least one requirement of the following (a) to (d). It meets preferably at least one requirement and as many requirements as possible, and most preferably all of the requirements. Further, when at least two requirements are met, it is preferable that at least requirement (a) is met.

requirement (a): a particle diameter being 0.5 to 40 μm, preferably 0.5 to 20 μm, more preferably 1 to 10 μm; it may be 2 to 40 μm or 2 to 20 μm;

requirement (b): a degree of crystallinity having 0.35 deg or less of a half band width, preferably 0.26 deg or less of the peak in the X-ray diffraction;

requirement (c): an initiation temperature of weight loss being 220° C. or higher, preferably 215° C. or higher according to TG-DTA analysis; and requirement (d): an impurity content of 1,000 ppm or less, preferably 600 ppm or less based on Na atom.

The basic metal nitrate of this embodiment is excellent in thermal stability.

The process for producing the basic metal nitrate is described below. The basic metal nitrate of the invention can be produced, for example, by reacting a metal nitrate with an alkali metal bicarbonate. The reaction procedure is represented by the following reaction scheme (II) in a case of the basic copper nitrate.

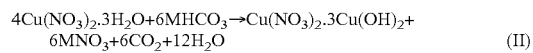

wherein M is an alkali metal.

As is clear from this reaction scheme (II), by selecting an alkali metal bicarbonate as a basic weak acid salt, the alkali metal bicarbonate is reacted with a metal nitrate, and an alkali metal ion is bound to a nitrate group to form an alkali metal nitrate that is well soluble in water. A bicarbonate anion is reacted with a hydrogen ion to form a carbon dioxide gas and water.

Thus, according to the process of the invention represented by reaction scheme (II), a nitrate formed is neutralized with a basic weak acid salt, and the neutralized weak acid is escaped from the solution as a gas because it is unstable. Accordingly, the formation of the basic metal nitrate is not interrupted.

As the process for producing the basic metal nitrate of the invention, the process in which the metal nitrate is reacted with the alkali metal bicarbonate is preferable. A process using a strong basic material such as an alkali metal hydroxide compound or an alkali metal carbonate (for example, potassium hydroxide or sodium carbonate) is also available. By the way, when the strong basic material is used, byproducts are formed by side reactions as shown by reaction schemes (III), (IV) and (V). The presence of such byproducts is considered to decrease the thermal stability.

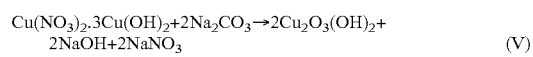

Examples of the metal nitrate include cobalt nitrate, copper nitrate, zinc nitrate, manganese nitrate, iron nitrate, molybdenum nitrate, bismuth nitrate, cerium nitrate and the like. Of these, copper nitrate is preferable. As copper nitrate, compounds represented by the following formula (I) are preferable, and copper nitrate 3-hydrate and copper nitrate 6-hydrate are more preferable. Such copper nitrate compounds are commercially available, and can be procured at low costs.

wherein n is 0 to 6.

The metal nitrate such as copper nitrate or the like can be used in the form of an aqueous solution or by being dissolved in a mixed solvent of a water-soluble organic solvent (for example, ethanol) and water. Generally, it is used in the form of an aqueous solution.

The concentration of the metal nitrate such as copper nitrate or the like in the solution is not particularly limited, and it can optionally be selected from a concentration of a 1% solution to a concentration of a saturated solution. Generally, it is preferable that the amount of the solvent is 200 to 5,000 ml per one mol of the metal nitrate such as copper nitrate or the like. When the concentration is higher than this range, the crystallization of the resulting basic metal nitrate such as a basic copper nitrate or the like tends to be worsened, and the thermal stability becomes poor. Incidentally, although excess solvent is used, the effect corresponding to the amount is not obtained, and treatment such as recovery or the like of alkali metal nitrates as byproducts takes much time. Thus, it is unwanted.

Examples of the alkali metal bicarbonate that neutralizes the metal nitrate such as copper nitrate or the like can include sodium bicarbonate, potassium bicarbonate, lithium bicarbonate, rubidium bicarbonate and cesium bicarbonate. Sodium bicarbonate and potassium bicarbonate are preferable from the economical aspect. Such alkali metal bicarbonates are mass-produced industrial agents, and industrial starting materials which are less costly and easily industrially available.

The alkali metal bicarbonate can be used in the form of a solid or a solution. As the solvent in the form of a solution, water or a mixed solvent of a water-soluble organic solvent (for example, ethanol) and water can be used. Generally, the alkali metal bicarbonate is used in the form of an aqueous solution.

The amount of the solvent is preferably about 1 to 10 liters per one mol of the alkali metal bicarbonate. When the alkali metal bicarbonate is used in the form of a solid or at a concentration higher than the above-described range, it is required to have some device, such as to decrease the concentration of nitric acid in the solution of the metal nitrate such as copper nitrate or the like. Otherwise, the alkali concentration is, in some cases, locally increased when it is added to the solution of the metal nitrate such as copper nitrate or the like, which induces formation of copper hydroxide as a side reaction and makes it impossible to form the basic metal nitrate such as a basic copper nitrate or the like having a good thermal stability with a good reproducibility.

The mixing ratio of the metal nitrate such as copper nitrate or the like and the alkali metal bicarbonate is that the amount of the alkali metal bicarbonate is preferably 2 mols or less, more preferably 1.0 to 1.7 mols per one mol of the metal nitrate such as copper nitrate or the like. When the amount of the alkali metal bicarbonate is less than this range, the quality of the basic metal nitrate such as a basic copper nitrate or the like is not improved, and a yield of the basic metal nitrate such as a basic copper nitrate or the like is decreased. Thus, it is meaningless in view of an industrial process. Further, when the amount is larger than this range, it is unwanted because a metal hydroxide such as copper hydroxide or the like is incorporated into the basic metal nitrate such as a basic copper nitrate or the like.

A method for mixing the metal nitrate such as copper nitrate or the like with the alkali metal bicarbonate is not particularly limited. Generally, it is advisable that a solution of the alkali metal bicarbonate is added to a solution of the metal nitrate such as copper nitrate or the like. Besides, a method can also be employed in which the metal nitrate such as copper nitrate or the like and the alkali metal bicarbonate are added almost simultaneously to a solution of which the pH is previously adjusted to a fixed value. In the addition, it is advisable to take such measures that these are mixed with stirring in order to avoid a local increase in the alkali concentration, one or more addition ports are provided, and so forth. Since the addition speed is influenced by a reaction scale, an extent of stirring, a concentration of an aqueous solution, the number of addition ports, a mixing temperature and the like, it has to be determined in consideration of these matters. Generally, it is advisable that they are gently added to control the local alkali concentration.

The temperature at which to mix the metal nitrate such as copper nitrate or the like with the alkali metal bicarbonate is not particularly limited. Generally, the mixing is conducted in the range of room temperature to 100° C. It is preferably conducted by heating.

An aging time after the completion of the addition is influenced by a mixing temperature, a mixing time and the like, and it cannot absolutely be determined. However, it is advisable that when the mixing temperature is high, the aging time is shortened. When the aging time is longer than as required, a part of the resulting basic metal nitrate such as a basic copper nitrate or the like is decomposed, and the thermal stability is poor. Further, when the aging time is shorter, the basic metal nitrate such as a basic copper nitrate or the like is not satisfactorily crystallized, and the thermal stability is poor. Thus, it is advisable to determine the aging time in consideration of these influences.

The reaction can also be conducted under the following reaction conditions other than the foregoing reaction conditions. The amount of the solvent is 20 to 400 ml, preferably 50 to 200 ml per one mol of the metal nitrate such as copper nitrate or the like. The amount of the solvent is 0.2 to 2.5 liters, preferably 0.5 to 1.5 liters per one mol of the alkali metal bicarbonate. The reaction temperature is 0 to 35° C., preferably 5 to 20° C.

The gas generating composition of the invention is described below. The gas generating composition of the invention comprises a fuel and a basic metal nitrate, and further, as required, an additive.

One embodiment of the basic metal nitrate used in the gas generating composition of the invention is that it meets at least one requirement selected from the following (a-1) to (a-3), preferably any two requirements, more preferably three requirements:

requirement (a-1): a particle diameter of 0.5 to 40 μl m, preferably 0.5 to 20 μm, more preferably 1 to 10 μm;

requirement (a-2): a specific surface area of particles being 0.4 to 6.0 $m^2/g$, preferably 0.5 to 4.0 $m^2/g$, more preferably 0.5 to 2.5 $m^2/g$; and requirement (a-3): a bulk density of particles being 0.4 g/ml or more, preferably 0.4 to 1.0 g/ml, more preferably 0.7 to 1.0 g/ml.

By meeting requirements (a-1) to (a-3), the following excellent effects are provided when producing a gas generating composition comprising a compound of which the stability is decreased in combination with a basic metal nitrate, for example, guanidine derivatives (for example, nitroguanidine) and a basic metal nitrate (for example, a basic copper nitrate) for the following reasons and the like. By the way, the case of using nitroguanidine and a basic copper nitrate providing great effects in particular is described below. However, the gas generating composition of the invention is not limited to this combination.

When nitroguanidine (NQ) is mixed with a basic copper nitrate (BCN) and the physical and chemical interactions between NQ and BCN are great, the decomposition temperature of NQ and BCN is decreased, which has an adverse effect on the performance of the gas generating composition. That is, an interaction (for example, the hydrogen bond or the van der Waals force) occurs between —$NH_2$ of NQ and —OH of BCN. At a high temperature or the like, water or the like is generated by a chemical reaction such as dehydration or the like to exert an adverse effect on the performance of the gas generating composition. However, when requirements (a-1) to (a-3) are met, the following functional effects are provided, and the adverse effect on the performance of the gas generating composition is prevented.

[Functional Effect Provided by Requirement (a-1)]

When the particle diameter of BCN is too small, a large amount of BCN is adhered to the surface of NQ or the like to increase the interaction therebetween, and there occur influences such as a decrease in decomposition temperature and the like. Accordingly, the particle diameter is limited to the range of requirement (a-1), whereby the interaction can be decreased to prevent occurrence of the decrease in decomposition temperature and the like.

[Functional Effect Provided by Requirement (a-2)]

When the specific surface area of BCN is large, the total surface area of BCN is, in comparison with the use of BCN having a small specific surface area, increased even with the same amount of BCN, so that the interaction between NQ and BCN is increased. Accordingly, the specific surface area is limited to the range of requirement (a-2), whereby the interaction can be decreased to prevent occurrence of the decrease in thermal decomposition temperature and the like.

[Functional Effect Provided by Requirement (a-3)]

When the bulk density of BCN is low, the volume per unit weight is increased, and the specific surface area is increased. Accordingly, requirement (a-2) is not met. Further, in case of coagulated particles, when BCN is cracked during the production of the gas generating composition, since the interaction between a fresh cracked surface generated at that time and NQ is great, firmly coagulated particles which have the high bulk density can reduce the interaction to prevent the occurrence of the decrease in decomposition temperature and the like.

The other embodiment of the basic metal nitrate used in the gas generating composition of the invention further meets at least one requirement selected from (b) to (d), preferably any two requirements, more preferably three requirements in addition to (a-1) to (a-3):

requirement (b): a degree of crystallinity having 0.35 deg or less of a half band width, preferably 0.26 deg or less in the peak of the X-ray diffraction;

requirement (c): an initiation temperature of weight loss being 220° C. or higher, preferably 215° C. or higher according to TG-DTA analysis; and requirement (d): an impurity content of 1,000 ppm or less, preferably 600 ppm or less based on Na atom.

By meeting requirements (b) and (c), the stability of the basic copper nitrate itself can be improved. Further, by meeting requirement (d), the stability in case of the combination of nitroguanidine and the basic copper nitrate can be increased. Still further, by meeting requirements (b) to (d), the effect of controlling the interaction between nitroguanidine and the basic copper nitrate can be increased more.

The other embodiment of the basic metal nitrate used in the gas generating composition of the invention is that the basic metal nitrate is in the form of secondary particles of coagulated principal particles, the secondary particles meeting at least one requirement selected from the following (a-1) to (a-3), preferably any two requirements, more preferably three requirements:

requirement (a-1): a particle diameter of 0.5 to 40 μm, preferably 0.5 to 20 μm, more preferably 1 to 10 μm;

requirement (a-2): a specific surface area of particles being 0.4 to 6.0 m$^2$/g, preferably 0.5 to 4.0 m$^2$/g, more preferably 0.5 to 2.5 m$^2$/g; and requirement (a-3): a bulk density of particles being 0.4 g/ml or more, preferably 0.4 to 1.0 g/ml, more preferably 0.7 to 1.0 g/ml.

By meeting requirements (a-1) to (a-3), the above-mentioned effects can be obtained.

Another embodiment, when the basic metal nitrate used in the gas generating composition of the invention is in the form of coagulated particles, further meets at least one requirement selected from (b) to (d), preferably any two requirements, more preferably three requirements in addition to (a-1) to (a-3):

requirement (b): a degree of crystallinity having 0.35 deg or less of a half band width, preferably 0.26 deg or less in the peak of the X-ray diffraction;

requirement (c): an initiation temperature of weight loss being 220° C. or higher, preferably 215° C. or higher according to TG-DTA analysis; and requirement (d): an impurity content of 1,000 ppm or less, preferably 600 ppm or less based on Na atom.

By meeting requirements (b) to (d), the above-described effects can be obtained.

This basic metal nitrate in the form of secondary particles of coagulated principal particles is preferably formed by coagulating a large number of principal particles having the form of needles to plates and/or spheres to similar shapes thereto. The "form of needles to plates" means only particles having the form of needles, only particles having the form of plates and a mixture of particles having the form of needles and particles having the form of plates with a width gradually increased from the width of particles having the form of needles. The "form of spheres to similar shapes thereto" means only spherical particles, only particles having the form of similar shapes thereto, for example, particles having concavo-convex portions on the spherical surface or oval particles, and a mixture of spherical particles and particles having the form of similar shapes thereto such as an oval shape and the like.

The basic metal nitrate formed from the secondary particles is obtained by laminating and coagulating, for example, a large number of principal particles having the form of needles to plates. Principal particles radially arranged in the lowermost layer and laminated radially unidirectionally in order, for example, principal particles having the form of needles to plates and laminated in the "chrysanthemum shape" are proposed.

The basic metal nitrate formed from the secondary particles of coagulated principal particles is obtained by changing the concentrations of the metal nitrate and the alkali metal bicarbonate, the reaction temperature and the aging time in the process for producing the basic metal nitrate.

The amount of the solvent is preferably 20 to 400 ml, more preferably 50 to 200 ml per one mol of the metal nitrate such as copper nitrate or the like (based on anhydride). The amount of the solvent is preferably 0.2 to 2.5 liters, more preferably 0.5 to 1.5 liters per one mol of the alkali metal bicarbonate.

The reaction temperature is preferably 10 to 35° C., more preferably approximately room temperature. The aging time is preferably set to be longer than in the heating.

The fuel contained in the gas generating composition of the invention is selected from the group consisting of guanidine derivatives, azole derivatives, triazine derivatives and transition metal complexes.

As the guanidine derivatives, at least one selected from the group consisting of guanidine, mono-, di- or tri-aminoguanidine nitrate, guanidine nitrate, guanidine carbonate, nitroguanidine (NQ), dicyandiamide (DCDA) and nitroaminoguanidine nitrate is proposed. Of these, nitroguanidine and dicyandiamide are preferable.

As the azole derivatives, at least one selected from the group consisting of tetrazole, 5-aminotetrazole, 5.5'-bi-1H-tetrazole, 5-nitroaminotetrazole, zinc salt of 5-aminotetrazole, copper salt of 5-aminotetrazole, bitetrazole, potassium salt of bitetrazole (BHTK), sodium salt of bitetrazole, magnesium salt of bitetrazole, calcium salt of bitetrazole, diammonium salt of bitetrazole (BHTNH$_3$), copper salt of bitetrazole and melamine salt of bitetrazole. Of these, diammonium salt of bitetrazole is preferable because the content of the nitrogen atom is 81.4% by weight, LD$_{50}$ (oral-rat) is 2,000 mg/kg and the combustion efficiency is good. The bitetrazole compounds here refer to include 5-5' compounds and 1-5' compounds having two tetrazole rings, and 5-5' compounds are preferable because of the cost and the easy procurement.

As the triazine derivatives, at least one selected from the group consisting of melamine, trimethylolmelamine, alkylated methylolmelamine, ammeline, ammeland, cyanuric acid, melam, melem, melamine nitrate, melamine perchlorate, trihydrazinotriazine and a nitro compound of melamine is proposed. Of these, melamine and trihydrazinotriazine (THT) are preferable because LD$_{50}$ (oral-rat) is 3,161 mg/kg, the thermal stability is high, the safety is secured in handling and the cost is low.

Of these compounds of the fuel, nitroguanidine is especially preferable because the physical and chemical interactions can be decreased when it is used in combination with the basic metal nitrate.

The content of the fuel in the gas generating composition varies with the type of the oxidizing agent and the oxygen balance. It is preferably 10 to 60% by weight, more preferably 20 to 50% by weight.

The content of the basic metal nitrate in the gas generating composition is preferably 40 to 90% by weight, more preferably 50 to 80% by weight.

The gas generating composition can further contain an additives such as a binder, a slag-forming agent and the like. As the binder, at least one selected from the group consisting of carboxymethylcellulose (CMC), sodium salt of carboxymethylcellulose (CMCNa), potassium salt of carboxymethylcellulose, ammonium salt of carboxymethylcellulose, cellulose acetate, cellulose acetatebutylate (CAB), methyl cellulose (MC), ethyl cellulose (EC), hydroxyethyl cellulose (HEC), ethylhydroxyethyl cellulose (EHEC), hydroxypropyl cellulose (HPC), carboxymethylethyl cellulose (CMEC), fine crystalline cellulose, polyacrylic amide, amine products of polyacrylic amide, polyacrylic hydrazide, a copolymer of an acrylic amide and a metal salt of acrylic acid, a copolymer of polyacrylic amide and polyacrylic ester, polyvinyl alcohol, acrylic rubber, guar gum, starch, silicone, molybdenum disulfide, Japanese acid clay, talc, bentonite, diatomaceous earth, kaolin, calcium stearate, silica, alumina, sodium silicate, silicon nitride, silicon carbide, hydrotalcite, mica, a metal oxide, a metal hydroxide, a metal carbonate, a basic metal carbonate and a molybdate is proposed. Of these, guar gum is preferable in consideration of the combination of the fuel and the basic metal nitrate.

As a metal hydroxide, at least one selected from the group consisting of cobalt hydroxide and aluminum hydroxide is proposed. As a metal carbonate and a basic metal carbonate, at least one selected from the group consisting of calcium carbonate, cobalt carbonate, a basic zinc carbonate, a basic copper carbonate, a basic cobalt carbonate, a basic iron carbonate, a basic bismuth carbonate and a basic magnesium carbonate is proposed. As a molybdate, at least one selected from the group consisting of cobalt molybdate and ammonium molybdate is proposed.

The content of the additives such as the binder and the like in the gas generating composition is preferably 0.1 to 15% by weight, more preferably 0.5 to 12% by weight.

As the gas generating composition of the invention, it is preferable that when the gas generating composition (containing 40 g of the gas generating agent) is maintained in a closed state, specifically, it is charged into a stainless steel container having an inner capacity of 118.8 ml and maintained in a closed state at 110° C. for 400 hours, the weight loss ratio of the gas generating agent is 2.0% or less, preferably 1.0% or less, more preferably 0.5% or less.

The gas generating composition of the invention can be molded in a desired shape, and formed into a molded article in the shape of a single-perforated cylinder, a perforated (porous) cylinder or pellets. These molded articles can be produced by a method in which the gas generating composition is mixed with water or an organic solvent and the mixture is extrusion-molded (molded articles in the form of a single-perforated cylinder and a perforated (porous) cylinder) or by a compression-molding method using a pelletizer (molded article in the form of pellets).

The gas generating composition of the invention can be used in, for example, an inflator for an air bag of a driver side, an inflator for an air bag of a passenger side, an inflator for a side air bag, an inflator for an inflatable curtain, an inflator for a knee bolster, an inflator for an inflatable seat belt, an inflator for a tubular system and a gas generator for a pretensioner in various vehicles.

Further, the inflator using the gas generating composition of the invention may be a pyrotechnic type in which a gas is supplied only from a gas generating agent alone or a hybrid type in which a gas is supplied from both of a compressed gas such as argon or the like and a gas generating agent.

Moreover, the gas generating composition of the invention can also be used as an igniting agent called an enhancer (or a booster) for transferring energy of a detonator or a squib to a gas generating agent.

EMBODIMENT 2 OF THE INVENTION

The gas generating composition of the invention can be a composition comprising components (a) and (b) as essential components or a composition comprising components (a), (b) and (c) as essential components.

Tetrazole derivatives as component (a) used in the invention are preferable because the content of a nitrogen atom in a molecule is high, the toxicity is low and the burning rate is increased in combination with component (b).

Examples of the tetrazole derivatives include tetrazole compounds (except for bitetrazole compounds) and bitetrazole compounds. As the tetrazole compounds (except for bitetrazole compounds), at least one selected from the group consisting of tetrazole, 5-aminotetrazole, 5,5'-bi-1H-tetrazole, 5-nitroaminotetrazole, zinc salt of 5-aminotetrazole and copper salt of 5-aminotetrazole is proposed. As the bitetrazole compounds, at least one selected from the group consisting of bitetrazole, potassium salt of bitetrazole (BHTK), sodium salt of bitetrazole, magnesium salt of bitetrazole, calcium salt of bitetrazole, diammonium salt of bitetrazole (BHTNH$_3$), copper salt of bitetrazole and melamine salt of bitetrazole is proposed.

Of these, diammonium bitetrazole is preferable because the content of the nitrogen atom is 81.4% by weight, LD$_{50}$ (oral-rat) is 2,000 mg/kg and the combustion efficiency is good. The bitetrazole compounds here referred to include 5-5' compounds and 1-5' compounds having two tetrazole rings, and 5-5' compounds are preferable because of the cost and the easy procurement.

In component (a) used in the invention, the guanidine derivatives can be divided into two groups in view of the combination with other components and predetermined requirements (1) to (3) to be met.

The first group is at least one guanidine derivative selected from the group consisting of guanidine, guanidine carbonate, nitroguanidine, dicyandiamide, nitroaminoguanidine and nitroaminoguanidine nitrate.

The second group is at least one guanidine derivative selected from the group consisting of guanidine, mono-, di- or tri-aminoguanidine nitrate, guanidine nitrate, guanidine carbonate, nitroguanidine (NQ), dicyandiamide (DCDA), nitroaminoguanidine and nitroaminoguanidine nitrate.

The guanidine derivatives as component (a) when the gas generating composition of the invention is the composition comprising components (a) and (b) as essential components or the composition comprising components (a), (b) and (c) as essential components are the guanidine derivatives of the first group.

The basic metal nitrate as component (b) used in the invention generally includes components represented by the following formula. Further, some compounds are hydrates thereof. In the formula, M represents a metal, x' represents the number of metals, y and y' each represent the number of $NO_3$ ions, z' represents the number of OH ions, and n represents a ratio of an M(OH)$_z$ moiety to an M(NO$_3$)$_y$ moiety.

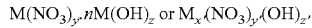

$M(NO_3)_y \cdot nM(OH)_z$ or $M_{x'}(NO_3)_{y'}(OH)_{z'}$

Examples of the compounds corresponding to the formula include compounds containing, as a metal M, copper, cobalt, zinc, manganese, iron, molybdenum, bismuth and cerium, such as $Cu_2(NO_3)(OH)_3$, $Cu_3(NO_3)(OH)_5 \cdot 2H_2O$, $CO_2(NO_3)(OH)_3$, $Zn_2(NO_3)(OH)_3$, $Mn(NO_3)(OH)_2$, $Fe_4(NO_3)(OH)_{11} \cdot 2H_2O$, $Bi(NO_3)(OH)_2$ and $Ce(NO_3)_3(OH) \cdot 3H_2O$.

As the basic metal nitrate being component (b), at least one selected from the group consisting of a basic copper nitrate (BCN), a basic cobalt nitrate, a basic zinc nitrate, a basic manganese nitrate, a basic iron nitrate, a basic molybdenum nitrate, a basic bismuth nitrate and a basic cerium nitrate is proposed. Of these, a basic copper nitrate is preferable.

The basic copper nitrate is excellent in thermal stability, as compared with ammonium nitrate as an oxidizing agent, because no phase transfer occurs in the range of the use temperature and the melting point is high. Further, since the basic copper nitrate acts to lower a combustion temperature of a gas generating agent, amounts of generated nitrogen oxides can be decreased.

Component (b) can be a mixture of the basic metal nitrate and at least one other oxidizing agent. In case of the mixture, an alkali metal nitrate can be incorporated as the other oxidizing agent.

The alkali metal nitrate is a component to increase the burning rate of the gas generating composition, and examples thereof include potassium nitrate, sodium nitrate, potassium perchlorate, lithium nitrate and the like. Of these, potassium nitrate is preferable.

When component (b) is the mixture, the content of the basic metal nitrate in the mixture is preferably 55 to 99.9% by weight, more preferably 75 to 99.5% by weight, further preferably 90 to 99.2% by weight.

When the gas generating composition of the invention contains components (a) and (b), the content of component (a) is preferably 5 to 60% by weight, more preferably 15 to 55% by weight. The content of component (b) is preferably 40 to 95% by weight, more preferably 45 to 85% by weight.

A preferable example of the composition comprising components (a) and (b) is a composition comprising (a) diammonium salt of bitetrazole and (b) a basic copper nitrate. In this case, the content of (a) ammonium salt of bitetrazole is 5 to 60% by weight, preferably 15 to 55% by weight, more preferably 15 to 45% by weight or 15 to 35% by weight, and the content of (b) a basic copper nitrate is 40 to 95% by weight, preferably 45 to 85% by weight, more preferably 55 to 85% by weight or 65 to 85% by weight.

Another preferable example of the composition comprising components (a) and (b) is a composition comprising (a) nitroguanidine and (b) a basic copper nitrate. In this case, the content of (a) nitroguanidine is 30 to 70% by weight, preferably 40 to 60% by weight. The content of (b) a basic copper nitrate is 30 to 70% by weight, preferably 40 to 60% by weight.

Still another preferable example of the composition comprising components (a) and (b) is a composition comprising (a) dicyandiamide and (b) a basic copper nitrate. In this case, it is preferable that the content of (a) dicyandiamide is 15 to 30% by weight and the content of (b) a basic copper nitrate is 70 to 85% by weight.

The binder and/or the slag-forming agent as component (c) used in the invention is not crosslinkable. At least one selected from the group consisting of carboxymethylcellulose (CMC), sodium salt of carboxymethylcellulose (CMCNa), potassium salt of carboxymethylcellulose, ammonium salt of carboxymethylcellulose, cellulose acetate, cellulose acetatebutylate (CAB), methyl cellulose (MC), ethyl cellulose (EC), hydroxyethyl cellulose (HEC), ethylhydroxyethyl cellulose (EHEC), hydroxypropyl cellulose (HPC), carboxymethylethyl cellulose (CMEC), fine crystalline cellulose, polyacrylic amide, amine products of polyacrylic amide, polyacrylic hydrazide, a copolymer of an acrylic amide and a metal salt of acrylic acid, a copolymer of polyacrylic amide and polyacrylic ester, polyvinyl alcohol, acrylic rubber, polysaccharides including guar gum and starch, silicone (except for a silicone resin), molybdenum disulfide, Japanese acid clay, talc, bentonite, diatomaceous earth, kaolin, calcium stearate, silica, alumina, sodium silicate, silicon nitride, silicon carbide, hydrotalcite, mica, a metal oxide, a metal hydroxide, a metal carbonate, a basic metal carbonate and a molybdate is proposed.

Polysaccharides including guar gum or starch as component (c) are not particularly limited so long as they are sticky and can be applied to a wet-molding method and a dry-molding method. Examples thereof include various gums such as gum arabic except for guar gum, tragacanth gum and the like, chitin, chitosan, hyaluronic acid and the like.

As a metal oxide being component (c), at least one selected from the group consisting of copper oxide, iron oxide, zinc oxide, cobalt oxide, manganese oxide, molybdenum oxide, nickel oxide and bismuth oxide is proposed. As a metal hydroxide, at least one selected from the group consisting of cobalt hydroxide and aluminum hydroxide is proposed. As a metal carbonate and a basic metal carbonate, at least one selected from the group consisting of calcium carbonate, cobalt carbonate, a basic zinc carbonate, a basic copper carbonate, a basic cobalt carbonate, a basic iron carbonate, a basic bismuth carbonate and a basic magnesium carbonate is proposed. As a molybdate, at least one selected from the group consisting of cobalt molybdate and ammonium molybdate is proposed. These compounds as component (c) can act as the slag-forming agent and/or the binder.

For increasing the ignitability of the gas generating composition, sodium salt of carboxymethylcellulose and potassium carboxymethylcellulose are preferable. Of these, sodium carboxymethylcellulose is more preferable.

When the gas generating composition of the invention comprises components (a), (b) and (c), the content of component (a) is preferably 5 to 60% by weight, more preferably 15 to 55% by weight. The content of component (b) is preferably 40 to 95% by weight, more preferably 45 to 85% by weight. The content of component (c) is preferably 0.1 to 25% by weight, more preferably 0.1 to 15% by weight, further preferably 0.1 to 10% by weight.

A preferable example of the composition comprising components (a), (b) and (c) is a composition comprising (a) diammonium salt of bitetrazole, (b) a basic copper nitrate and (c) sodium salt of carboxymethylcellulose. In this case, it is preferable that the content of (a) diammonium salt of bitetrazole is 15 to 40% by weight, the content of (b) a basic copper nitrate is 45 to 80% by weight and the content of (c) sodium carboxymethylcellulose is 0.1 to 15% by weight.

Another preferable example of the composition comprising components (a), (b) and (c) is a composition comprising (a) diammonium salt of bitetrazole, (b) a basic copper nitrate, (c-1) sodium salt of carboxymethylcellulose and (c-2) component (c) except for (c-1). In this case, it is preferable that the content of (a) diammonium salt of bitetrazole is 15 to 35% by weight, the content of (b) a basic copper nitrate is 30 to 70% by weight, the content of (c-1) sodium salt of carboxymethylcellulose is 0.1 to 15% by weight and the content of (c-2) is 1 to 45% by weight.

Still another preferable example of the composition comprising components (a), (b) and (c) is a composition comprising (a) nitroguanidine, (b) a basic copper nitrate and (c) sodium carboxymethylcellulose. In this case, it is preferable that the content of (a) nitroguanidine is 15 to 55% by weight, the content of (b) a basic copper nitrate is 45 to 70% by weight and the content of (c) sodium salt of carboxymethylcellulose is 0.1 to 15% by weight.

Other preferable example of the composition comprising components (a), (b) and (c) is a composition comprising (a) nitroguanidine, (b) a basic copper nitrate, (c-1) sodium carboxymethylcellulose and (c-2) component (c) except for (c-1). In this case, it is preferable that the content of (a) nitroguanidine is 15 to 50% by weight, the content of (b) a basic copper nitrate is 30 to 65% by weight, the content of (c-1) sodium carboxymethylcellulose is 0.1 to 15% by weight and the content of (c-2) is 1 to 40% by weight.

Other preferable example of the composition comprising components (a), (b) and (c) is a composition comprising (a) nitroguanidine, (b) a basic copper nitrate and (c) guar gum. In this case, the content of (a) nitroguanidine is preferably 20 to 60% by weight, more preferably 30 to 50% by weight, the content of (b) a basic copper nitrate is preferably 35 to 75% by weight, more preferably 40 to 65% by weight, and the content of (c) guar gum is preferably 0.1 to 10% by weight, more preferably 1 to 8% by weight.

Other preferable example of the composition comprising components (a), (b) and (c) is a composition comprising (a) nitroguanidine, (b) a basic copper nitrate, (c-1) guar gum and (c-2) component (c) except for (c-1). In this case, the content of (a) nitroguanidine is preferably 20 to 60% by weight, more preferably 30 to 50% by weight, the content of (b) a basic copper nitrate is preferably 30 to 70% by weight, more preferably 40 to 60% by weight, the content of (c-1) guar gum is preferably 0.1 to 10% by weight, more preferably 2 to 8% by weight, and the content of (c-2) is preferably 0.1 to 10% by weight, more preferably 0.3 to 7% by weight.

The composition comprising (a) nitroguanidine and (b) a basic copper nitrate or the composition comprising (a) nitroguanidine, (b) a basic copper nitrate and (c) guar gum provides effects in the following points (I) to (III).

(I) Since the thermal decomposition temperature of nitroguanidine (approximately 220° C.) is close to the thermal decomposition temperature of a basic copper nitrate (approximately 200° C.), the reaction (combustion) of nitroguanidine and a basic copper nitrate is closer to the complete combustion, and toxic gases (CO, NO, $NO_2$, $NH_3$ and the like) are less generated. Further, since the use of a basic copper nitrate lowers the combustion temperature of the gas generating agent, the generated amount of so-called thermal $NO_x$ is decreased.

(II) In the combustion, mist of molten copper is generated owing to a basic copper nitrate. However, since the melting point of copper (1,083° C.) is high, mist can easily be removed as solid mist by being cooled to approximately 1,000° C. Thus, mist can easily be removed in comparison with other mist (for example, since the melting point of $K_2O$ is 400° C., the cooling to less than 400° C. is required), and mist is hardly discharged outside the inflator.

(III) The use of guar gum provides a high thermal stability compared with the use of CMC—Na. In case of using CMC—Na, an OH ion generated from a basic copper nitrate and Na of CMC—Na are reacted to form NaOH, and this NaOH sometimes decomposes nitroguanidine to decrease the thermal stability. However, guar gum does not pose such a problem.

Other preferable example of the composition comprising components (a), (b) and (c) is a composition comprising (a) dicyandiamide, (b) a basic copper nitrate and (c) sodium salt of carboxymethylcellulose. In this case, it is preferable that the content of (a) dicyandiamide is 15 to 25% by weight, the content of (b) a basic copper nitrate is 60 to 80% by weight and the content of (c) sodium salt of carboxymethylcellulose is 0.1 to 20% by weight.

Other preferable example of the composition comprising components (a), (b) and (c) is a composition comprising (a) dicyandiamide, (b) a basic copper nitrate, (c-1) sodium salt of carboxymethylcellulose and (c-2) component (c) except for (c-1). In this case, it is preferable that the content of (a) dicyandiamide is 15 to 25% by weight, the content of (b) a basic copper nitrate is 55 to 75% by weight, the content of (c-1) sodium salt of carboxymethylcellulose is 0 to 10% by weight or 0.1 to 10% by weight and the content of (c-2) is 1 to 20% by weight.

Other preferable example of the composition comprising components (a), (b) and (c) is a composition comprising (a) guanidine nitrate, (b) a basic copper nitrate and (c) sodium salt of carboxymethylcellulose. In this case, it is preferable that the content of (a) guanidine nitrate is 15 to 60% by weight, the content of (b) a basic copper nitrate is 40 to 70% by weight and the content of (c) sodium salt of carboxymethylcellulose is 0.1 to 15% by weight.

Other preferable example of the composition comprising components (a), (b) and (c) is a composition comprising (a) guanidine nitrate, (b) a basic copper nitrate, (c-1) sodium salt of carboxymethylcellulose and (c-2) component (c) except for (c-1). In this case, it is preferable that the content of (a) guanidine nitrate is 15 to 55% by weight, the content of (b) a basic copper nitrate is 25 to 60% by weight, the content of (c-1) sodium salt of carboxymethylcellulose is 0.1 to 15% by weight and the content of (c-2) is 1 to 40% by weight.

When component (b) is a mixture of a basic copper nitrate and potassium nitrate in the gas generating composition of the invention, the effect of improving the burning rate is obtained in addition to the effects (I) to (III).

The gas generating composition of the invention can be a composition comprising (a), (b) and (d) a combustion-controlling agent (combustion-improving agent) as essential components or a composition comprising (a), (b), (c) and (d) a combustion-controlling agent (combustion-improving agent). The guanidine derivatives as component (a) when component (d) is contained as an essential component are guanidine derivatives of the second group.

The combustion-improving agent as component (d) is a component that acts to improve combustion properties such as a burning rate, a duration of combustion, an ignitability and the like of the overall gas generating composition. As the combustion-improving agent, at least one selected from the group consisting of silicon nitride, silica, a nitrite, a nitrate, a chlorate or a perchlorate of an alkali metal or an alkaline earth metal ($KNO_3$, $NaNO_3$, $KClO_4$ or the like), iron (III) hydroxide oxide [FeO(OH)], copper oxide, iron oxide, zinc oxide, cobalt oxide and manganese oxide is proposed. When iron (III) hydroxide oxide [FeO(OH)] of these is used, the combustion-accelerating effect of the binder is excellent when a binder having a large number of carbon atoms is incorporated, and this can contribute to accelerating the combustion of the overall gas generating composition.

The content of component (d) is preferably 1 to 10 parts by weight, more preferably 1 to 5 parts by weight per 100 parts by weight in total of components (a) and (b), or components (a), (b) and (c).

A preferable example of the composition comprising components (a), (b), (c) and (d) is a composition comprising (a) nitroguanidine, (b) a basic copper nitrate, (c) guar gum and (d) the combustion-improving agent. As (d) the combustion-improving agent, silica is preferable. In this case, it is preferable that the content of (a) nitroguanidine is 20 to 60% by weight, the content of (b) a basic copper nitrate is 35 to 75% by weight, the content of (c) guar gum is 0.1 to 10% by weight and the content of (d) the combustion-improving agent is 0.1 to 15% by weight.

Further, the gas generating composition of the invention comprises components (a) and (b), and can meet one requirement selected from the following (1) to (3), preferably two requirements, more preferably three requirements. In this case, the guanidine derivatives as component (a) are guanidine derivatives of the second group.

(1) A weight loss ratio of the gas generating agent when the gas generating composition is retained in a closed state at 90° C. for 1,000 hours or at 110° C. for 400 hours is 2.0% or less, preferably 1.0% or less, more preferably 0.5% or less.

This requirement (1) is a weight loss ratio of the gas generating composition when the gas generating composition is charged in a stainless steel container having an inner capacity of 118.8 ml and retained in a closed state at 90° C. for 1,000 hours or at 110° C. for 400 hours.

(2) Concentrations of trace gases contained in a gas generated by the combustion of the gas generating composition, as values measured in a 2,800-liter tank, 400 ppm or less for CO, 40 ppm or less for NO, 8 ppm or less for $NO_2$ and 100 ppm or less for $NH_3$.

This requirement (2) is that regarding concentrations of trace gases contained in a gas generated by the combustion of the gas generating composition, as values measured in a 2,800-liter tank, 400 ppm or less for CO, 40 ppm or less for NO, 8 ppm or less for $NO_2$ and 100 ppm or less for $NH_3$. Alternatively, they can be approximately 30%, preferably 30% or less, more preferably 20% or less, further preferably 10% (CO=120 ppm, NO=10 ppm, $NO_2$=2 ppm, $NH_3$=30 ppm) or less of IDLH values shown by NIOSH such that CO is 1,200 ppm or less, NO is 100 ppm or less, $NO_2$ is 20 ppm or less and $NH_3$ is 300 ppm or less.

Incidentally, these gas concentrations are, for example, values given when a test of a 2,800-liter tank is conducted under conditions of 20° C. and an output of 130 to 230 kPa using a standard single-type pyrotechnic inflator for a driver side. This gas generating composition can be used in another type of a gas generator regardless of the measuring conditions.

(3) A maximum internal pressure in a gas generator in the combustion of the gas generating composition is 7,840 to 22,500 kPa, preferably 8,820 to 17,640 kPa.

Further, the gas generating composition of the invention comprises components (a), (b) and (c), and can meet one requirement selected from the following (1) to (3), preferably two requirements, more preferably three requirements. The details of requirements (1) to (3) are the same as described above. In this case, the guanidine derivatives as component (a) are guanidine derivatives of the second group.

(1) A weight loss ratio of the gas generating agent when the gas generating composition is retained in a closed state at 90° C. for 1,000 hours or at 110° C. for 400 hours is 2.0% or less.

(2) Concentrations of trace gases contained in a gas generated by the combustion of the gas generating composition, as values measured in a 2,800-liter tank, 400 ppm or less for CO, 40 ppm or less for NO, 8 ppm or less for $NO_2$ and 100 ppm or less for $NH_3$.

(3) A maximum internal pressure in a gas generator in the combustion of the gas generating agent is 7,840 to 22,500 kPa.

When the gas generating composition of the invention is a composition comprising components (a), (b) and (d) as essential components or a composition comprising components (a), (b), (c) and (d), component (d) is not a component that inhibits the development of requirements (1) to (3). Thus, it meets requirements (1) to (3) like the composition free of component (d).

The gas generating composition of the invention can be molded in a desired shape, and formed into a molded article in the shape of a single-perforated cylinder, a perforated (porous) cylinder or pellets. These molded articles can be produced by a method in which the gas generating composition is mixed with water or an organic solvent and the mixture is extrusion-molded (molded articles in the form of a single-perforated cylinder and a perforated (porous) cylinder) or by a compression-molding method using a pelletizer (molded article in the form of pellets).

The gas generating composition of the invention can be used in, for example, an inflator for an air bag of a driver side, an inflator for an air bag of a passenger side, an inflator for a side air bag, an inflator for an inflatable curtain, an inflator for a knee bolster, an inflator for an inflatable seat belt, an inflator for a tubular system and a gas generator for a pretensioner in various vehicles.

Further, the gas generator using the gas generating composition of the invention or the molded article obtained therefrom may be a pyrotechnic type in which a gas is supplied only from a gas generating agent alone or a hybrid type in which a gas is supplied from both of a compressed gas such as argon or the like and a gas generating agent.

Moreover, the gas generating composition or the molded article obtained therefrom in the invention can also be used as an igniting agent called an enhancer (or a booster) for transferring energy of a detonator or a squib to a gas generating agent.

EXAMPLES

Figure 1:
FIG. 1 is a scanning electron micrograph (×10,000) of a basic copper nitrate obtained in Example 5.

The invention is illustrated more specifically by referring to the following Examples. However, the invention is not limited thereto.

(1) Identification of a Particle Diameter and a Particle Form (Whether or not it is in the Form of Coagulated Particles)

A sample powder was fixed on an exclusive sample base. A particle diameter of the sample powder in visual images for observation of ×500, ×2,000 and ×10,000 was measured using a scanning electron microscope, and a particle form was estimated at the same time. The particle diameter of principal particles when particles were (coagulated) secondary particles was likewise measured after secondary particles were crushed into principal particles. Incidentally, when particles were particles in the form of needles, a length was defined as a particle diameter. When particles were particles in the form of plates, a maximum diagonal length was defined as a particle diameter. Further, when particles were particles in the form of shapes similar to spheres, a major axis was defined as a particle diameter.

(2) Specific Surface Area

Measured by the BET method using a nitrogen gas.

(3) Bulk Density

A measuring cylinder filled with 10 ml of a sample powder was put on a horizontal base, and the horizontal base was tapped with the cylinder 30 times. Then, a bulk density was measured.

(4) Measurement of a Degree of Crystallization (Half Bandwidth)

A half band width was measured from a main peak obtained by the powder X-ray diffraction method (Rietvelt method).

(5) Measurement of TG-DTA (Thermogravimetric-Differential Thermal Analysis)

Conducted at a rate of temperature rise of 20/min.

(6) Impurity Content (Based on Na Atom)

Measured by atomic absorption spectrometry.

(7) Thermal Stability 5 g of a basic metal nitrate such as a basic copper nitrate or the like was charged into water, and heat-treated at 80° C. for 10 minutes. At this time, a change in appearance was measured. A product having a poor thermal stability turned black by this heat treatment.

(8) Thermal Stability Test (Weight Loss Ratio)

A gas generating composition (containing 40 g of a gas generating agent) was charged into an aluminum container to measure a total weight. (Total weight–weight of an aluminum container) was defined as a weight of a sample before the test. The aluminum container filled with the sample was placed in an SUS thick container (inner capacity 118.8 ml), and covered. This was put in a thermostat bath of 110° C. At this time, the container was rendered in a sealed state using a rubber packing and a clamp. After the lapse of a predetermined period of time, the SUS thick container was withdrawn from the thermostat bath. When the container was returned to room temperature, the container was opened, and the aluminum container was withdrawn therefrom. The total weight of the sample inclusive of the aluminum container was measured, and (total weight–weight of an aluminum container) was defined as a weight of the sample after the test. And, the change in weight was measured by comparing the weight before the test with that after the test to find a weight loss ratio, whereby the thermal stability was evaluated. The weight loss ratio was calculated from [(weight of a gas generating agent before test–weight of a gas generating agent after test)/weight of a gas generating agent before test]×100.

Comparative Example 1

241.6 g (1.00 mol) of copper nitrate 3-hydrate was charged in a beaker fitted with a stirrer, and then dissolved in 500 ml of distilled water which was poured therein, while being stirred. The resulting solution was heated at 60° C. A solution of 84.15 g (1.50 mols) of potassium hydroxide in 500 ml of distilled water was added dropwise over 1 hour while being stirred. After the addition of the potassium hydroxide aqueous solution was completed, the mixture was stirred at 60° C. for 30 minutes. The resulting gel-like precipitate was filtered at room temperature, and washed with distilled water. A basic copper nitrate obtained was a pale blue solid matter. The solid matter partially contained a gray material, and the filterability was bad. When a part of the washed product was dried in air at 110° C., the product turned black as a whole, decomposition was observed in the drying step, and the thermal stability was quite bad. The remaining washed product was dried at 110° C. under reduced pressure of 1,333.22 Pa (10 mmHg) to obtain a basic metal nitrate. The results of measurements are shown in Table 1.

Example 1

36.3 g of copper nitrate 3-hydrate was charged in a beaker fitted with a stirrer, and then dissolved in 100 ml of distilled water which was poured therein, while being stirred. The resulting solution was heated at 60° C. A solution of 18.9 g of sodium bicarbonate in 240 ml of water was added over 1 hour. After the addition was completed, the mixture was aged while being stirred at 60° C. for 60 minutes. The resulting gel-like precipitate was filtered at room temperature, and washed with distilled water. A pale blue solid matter having quite a good filterability was obtained. When a part of the washed product was dried in air at 110° C., the product maintained the pale blue color, and the thermal stability was quite good. The remaining washed product was dried at 110° C. under reduced pressure of 1,333.22 Pa to obtain a basic copper nitrate in an amount of 17.4 g (yield 96.5%). The results of measurements are shown in Table 1.

Example 2

36.3 g of copper nitrate 3-hydrate was charged in a beaker fitted with a stirrer, and then dissolved in 100 ml of distilled water which was poured therein, while being stirred. The resulting solution was heated at 80° C. A solution of 18.9 g of sodium bicarbonate in 240 ml of water was added over 1 hour. Immediately after the addition was completed, a precipitate was filtered, and washed with distilled water to obtain a pale blue solid matter having quite a good filterability. When a part of the washed product was dried in air at 110° C., the product maintained the pale blue color, and the thermal stability was good. The remaining washed product was dried at 110° C. under reduced pressure of 1,333.22 Pa to obtain a basic copper nitrate. The results of measurements are shown in Table 1.

Example 3

214.6 g (1.00 mol) of copper nitrate 3-hydrate was charged in a beaker fitted with a stirrer, and then dissolved in 500 ml of distilled water which was poured therein, while being stirred. The resulting solution was heated at 40° C. A solution of 126 g (1.50 mols) of sodium bicarbonate in 1,000 ml of distilled water was added over 1 hour. After the addition of sodium bicarbonate was completed, the mixture was heated to 80° C., and aged for 30 minutes while being stirred. A precipitate was filtered, washed, and dried to obtain a pale blue basic copper carbonate. The results of measurements are shown in Table 1.

Example 4

A pale blue basic copper carbonate was obtained in the same manner as in Example 1 except that the amount of sodium bicarbonate was 21.4 g. The results of measurements are shown in Table 1.

Comparative Example 2

214.6 g (1.00 mol) of copper nitrate 3-hydrate was charged in a beaker fitted with a stirrer, and then dissolved in 1,000 ml of distilled water which was poured therein, while being stirred. The resulting solution was heated at 95° C. 123.0 g (1.50 mols) of anhydrous sodium acetate was then added in small portions. After the addition of sodium acetate was completed, the mixture was further stirred for 30 minutes. The resulting precipitate was filtered at room temperature, washed, and dried to obtain a pale blue solid matter in an amount of 84.7 g (yield approximately 70.5%). However, the yield was bad in comparison with Example 1. The results of measurements are shown in Table 1.

Example 5

Figure 2:
FIG. 2 is a scanning electron micrograph (×10,000) of a basic copper nitrate obtained in Example 5.
Figure 3:
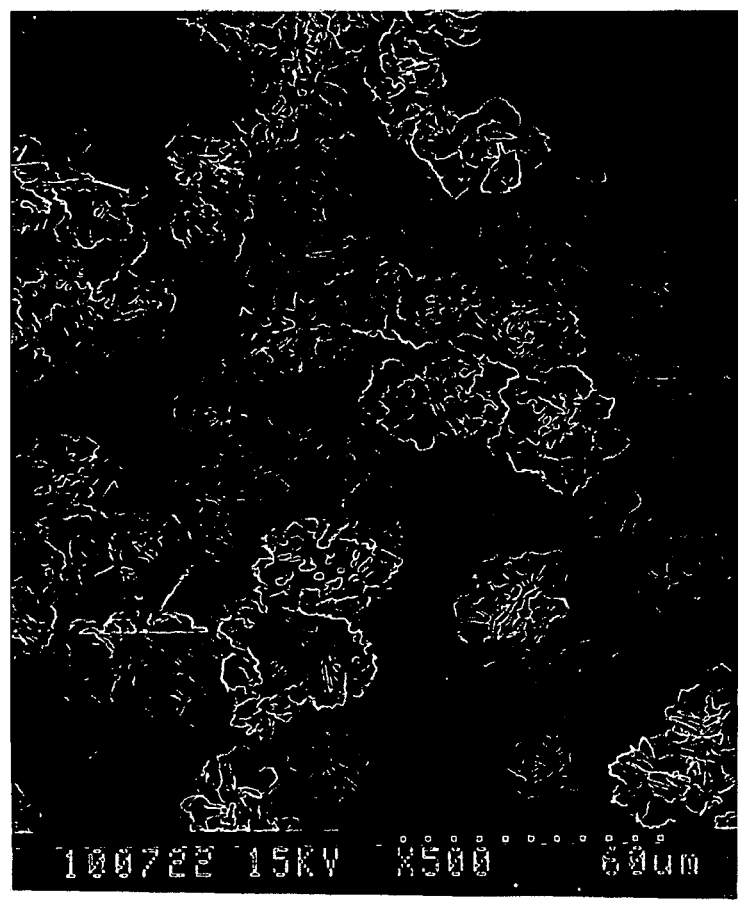
FIG. 3 is a scanning electron micrograph (×500) of a basic copper nitrate obtained in Example 5.
Figure 4:
FIG. 4 is a scanning electron micrograph (×2,000) of a basic copper nitrate obtained in Example 5.

36.3 g of copper nitrate 3-hydrate was charged in a beaker fitted with a stirrer, and then dissolved in 20 ml of distilled water which was poured therein, while being stirred at room temperature (20° C.) to obtain a solution. A solution of 18.9 g of sodium bicarbonate in 240 ml of water was added dropwise at room temperature over 1.5 hours. After the addition was completed, the mixture was aged at room temperature for 2 hours while being stirred. The resulting precipitate was filtered, washed with distilled water until the filtrate was neutralized, and dried at 110° C. under reduced pressure of 1,333.22 Pa until a fixed weight was reached to obtain 16.0 g of a basic copper nitrate in the form of particles coagulated in the "chrysanthemum shape". The results of measurements are shown in Table 2. By the way, the scanning electron micrographs of a basic copper nitrate obtained in Example 5 are shown in FIG. 1 (×10,000), FIG. 2 (×10,000), FIG. 3 (×500) and FIG. 4 (×2,000).

Example 6

24.2 g of copper nitrate 3-hydrate was dissolved in 105 ml of water, and a solution of 12.6 g of sodium bicarbonate in 240 ml of water was added dropwise at 60° C. over 1 hour with stirring. After the addition was completed, the mixture was aged at 60° C. over 1 hour while continuing the stirring to form a precipitate. The resulting precipitate was washed with pure water until the filtrate was neutralized, and dried in hot air at 110° C. until a fixed weight was reached. The results of measurements are shown in Table 2.

Example 7

Figure 5:
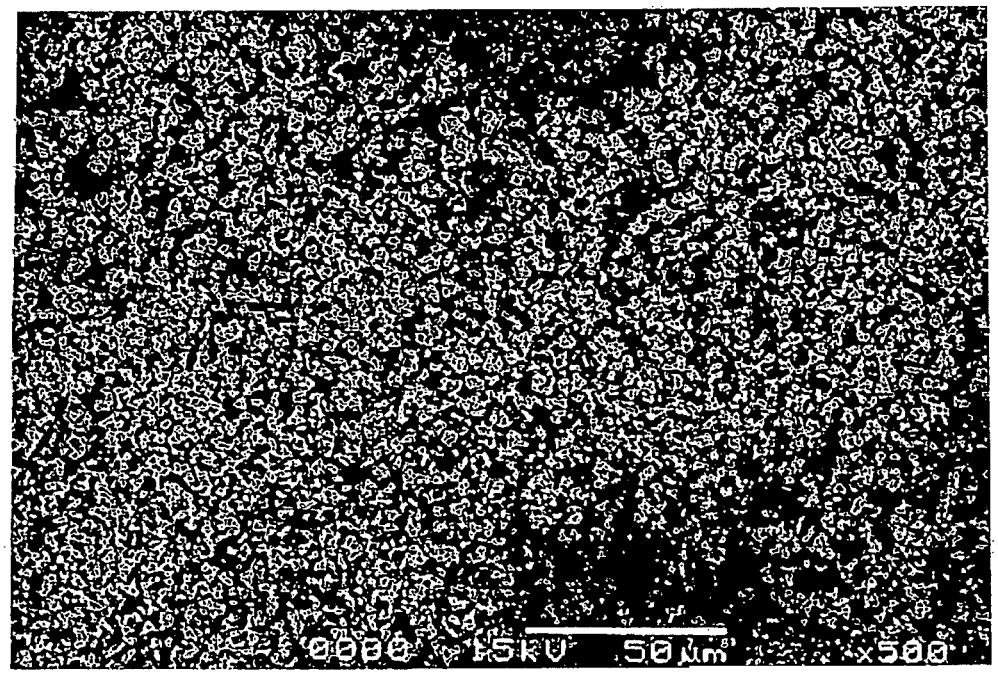
FIG. 5 is a scanning electron micrograph (×500) of a basic copper nitrate obtained in Example 7.
Figure 6:
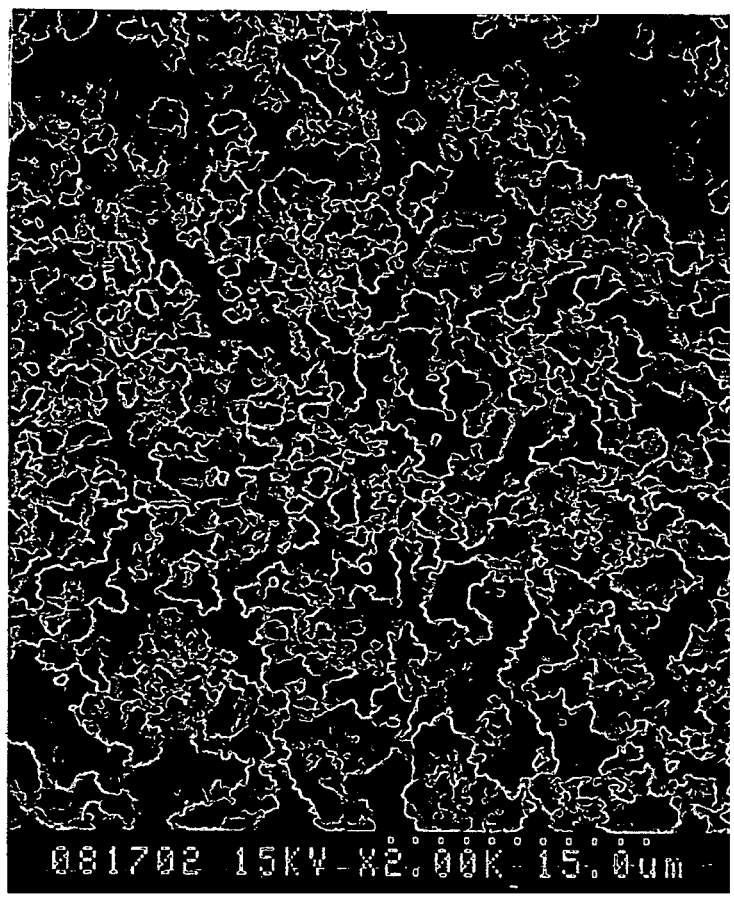
FIG. 6 is a scanning electron micrograph (×2,000) of a basic copper nitrate obtained in Example 7.
Figure 7:
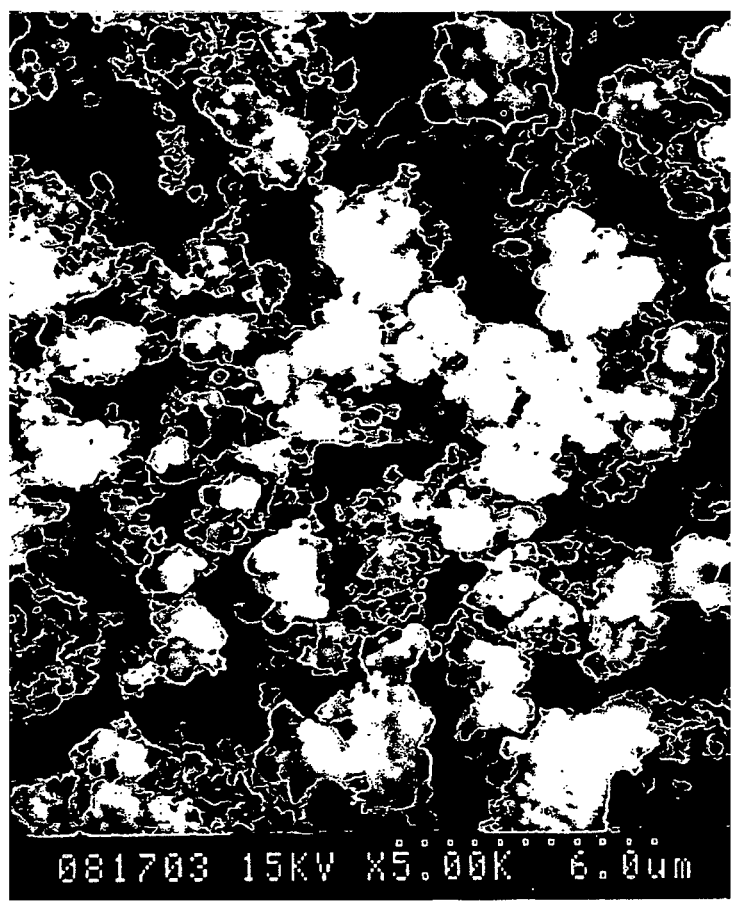
FIG. 7 is a scanning electron micrograph (×5,000) of a basic copper nitrate obtained in Example 7.

A solution of 90.5 g of copper nitrate in 50 g of water was continuously added to 200 g of water adjusted to a pH of 3.8 with nitric acid over 5.5 hours while the temperature was maintained at 5° C. During this time, a solution of 47.5 g of sodium bicarbonate in 600 g of water was added to maintain the pH between 5.4 and 5.6. After the completion of the addition, the mixture was filtered, washed, and dried to obtain 39.7 g of a basic copper nitrate. The results of measurements of the resulting basic copper nitrate are shown in Table 2, and the scanning electron micrographs (×500, ×2,000 and ×5,000) are shown in FIGS. 5, 6 and 7.

Example 8

44.2% by weight of nitroguanidine, 52.8% by weight of a basic copper nitrate in Example 5 and 3.0% by weight of guar gum were mixed to obtain a gas generating composition. The weight loss ratio of this composition was measured. Then, it was 0.12% when 94 hours passed, 0.25% when 234 hours passed, and 0.36% when 405 hours passed.

The composition of the invention is illustrated more specifically by referring to the following Examples. However, the invention is not limited thereto. In the tables, NQ represents nitroguanidine, BHTNH$_3$ represents ammonium salt of bitetrazole, BHTK represents potassium bitetrazole, DCDA represents dicyandiamide, 5-AT represents 5-aminotetrazole, Zn(5-AT) represents zinc salt of 5-aminotetrazole, BCN represents a basic copper nitrate [Cu$_2$(NO$_3$)(OH)$_3$], and CMCNa represents sodium salt of carboxymethylcellulose. Incidentally, the measuring methods are described in detail below.

(9) Thermal Stability Test (Weight Loss Ratio)

A gas generating composition (containing 40 g of a gas generating agent) was charged into an aluminum container to measure a total weight. (Total weight−weight of an aluminum container) was defined as a weight of a sample before the test. The aluminum container filled with the sample was placed in an SUS thick container (inner capacity 118.8 ml), and covered. At this time, the container was rendered in a sealed state using a rubber packing and a clamp. This was put in a thermostat bath of 90° C. or 110° C. After the lapse of 1,000 hours and 400 hours, the container was withdrawn from the thermostat bath. When the container was returned to room temperature, the container was opened, and the aluminum container was withdrawn therefrom. The total weight of the sample inclusive of the aluminum container was measured, and (total weight−weight of an aluminum container) was defined as a weight of the sample after the test. And, the change in weight was measured by comparing the weight before the test with that after the test to find a weight loss ratio, whereby the thermal stability was evaluated. The weight loss ratio was calculated from [(weight of a gas generating agent before test−weight of a gas generating agent after test)/weight of a gas generating agent before test]×100.

(10) Measurement of a Gas Concentration

The closed container after the completion of the above thermal stability test was put into a polyvinyl chloride bag filled with approximately 2 liters of air, and the bag was then closed. A clamp was unfastened in the bag to open the closed container, and the gas in the container was released into the bag. The gas in the bag was diffused, and rendered uniform. Then, the detecting tube was pierced into the bag, and the gas concentration was quickly measured.

(11) Measurement of an Internal Pressure

An internal pressure inside the container filled with the gas generating composition after the thermal stability test was measured.

Examples 9 to 17 and Comparative Examples 3 and 4

Gas generating compositions each having a formulation shown in Table 3 were produced. The combustion temperature, the gas output (unit "mol/100 g" indicates the number of mols of the gas generated per 100 g of the composition) and the amounts of generated CO and NO of these compositions according to theoretical calculations are shown in Table 3.

It indicates that any combustion temperatures in Examples 9 to 17 are quite lower than those in Comparative Examples 3 and 4 and less than 1,900 K, and that the temperatures are effective for decreasing the amount of generated NO. Further, the amounts of generated CO and NO are not permitted in practice unless the amount of generated CO being $2 \times 10^{-3}$ mol/100 g or less and the amount of generated NO being $2 \times 10^{-4}$ mol/100 g or less are attained at the same time. It is found that these Examples satisfy these conditions.

Examples 18 to 23

Gas generating compositions each having a formulation shown in Table 4 were produced. These compositions were tested for a friction sensitivity and a drop hammer sensitivity according to the explosives performance test method of JIS K 4810-1979. The results are shown in Table 4.

Examples 24 to 28

Gas generating compositions each having a formulation shown in Table 5 were produced. With respect to these compositions, a melting temperature with a TAS-type differential thermal analyzer manufactured by Rigaku K. K., a temperature at which to start heating and a temperature at which to start TG weight loss were measured. A rate of temperature rise in the measurement was 20° C./min, a measurement atmosphere was a nitrogen gas, and an amount of a sample in the measurement was 1 to 2 mg. The results are shown in Table 5.

Further, with respect to the composition in Example 26, the thermal stability test was conducted by the following method. The thermal stability test was conducted by allowing an aluminum container filled with the composition to stand in a thermostat bath of 110° C. for 400 hours. The weight loss ratio was measured from the change in weight of the composition before and after the test, and the thermal stability was evaluated. As a result, the weight loss ratio was as low as −0.31%, and no change in appearance was observed.

Examples 29 to 40

Gas generating compositions each having a formulation shown in Table 6 were produced. Each of these compositions was molded into a strand. A burning rate was measured in a nitrogen atmosphere at a pressure of 4,900, 6,860 or 8,820 kPa. A burning rate at 6,860 kPa and a pressure index of 4,900 to 8,820 kPa are shown in Table 6.

As stated above, the respective values shown in Examples 18 to 40 reveal that the compositions in these Examples meet the practical conditions as the gas generating composition for the inflator.

Examples 41 to 63

Gas generating compositions each having a formulation shown in Table 7 were produced. Each of the gas generating compositions was molded into 2 g of a strand. This strand was installed in a closed bomb having an inner capacity of 1 liter, and the inside of the bomb was purged with nitrogen. Further, the bomb was pressurized to 6,860 kPa with nitrogen. The strand was ignited by electronic conduction through a nichrome wire, and completely burned. Approximately 20 seconds after the electronic conduction, the burned gas was collected in a gas sampling bag, and the concentrations of $NO_2$, NO, CO and $CO_2$ were quickly analyzed with a detecting tube.

Examples 64 to 83

Gas generating compositions each having a formulation shown in Table 8 were produced, and the concentrations of $NO_2$, NO, CO and $CO_2$ were analyzed as in Examples 41 to 63.

Examples 84 to 102

Gas generating compositions each having a formulation shown in Table 9 were produced. A combustion temperature and a gas output (unit "mol/100 g" indicates the number of mols of a generated gas per 100 g of the composition) of these compositions according to theoretical calculations are shown in Table 9.

Example 103

A gas generating composition containing 44.2% by weight of NQ, 52.8% by weight of BCN and 3% by weight of guar gum was produced, and tested for a thermal stability by the following method. As a result, a weight loss ratio under conditions of 110° C. and 214 hours was 0.27%, and a weight loss ratio under conditions of 110° C. and 408 hours was 0.45%.

Examples 104 to 111

Gas generating composition each having a formulation shown in Table 10 was produced, and items shown in Table 10 were measured as in Examples 9 to 103.

TABLE 1

| | Temperature at which to start weight loss (° C.) | Thermal stability |
|---|---|---|
| Comparative Example 1 | 215 | pale blue → black |
| Example 1 | 220 | pale blue (no change in color) |
| Example 2 | | pale blue (no change in color) |
| Example 3 | 223 | pale blue (no change in color) |
| Example 4 | | pale blue (no change in color) |
| Comparative Example 2 | 219 | pale blue → pale gray |

TABLE 2

| | Particle form | (a) or (a-1) Particle diameter (μm) | (a-2) Specific surface area (m²/g) | (a-3) Bulk density (g/ml) | (b) Degree of crystallinity (half band width) | (c) Temperature at which to start weight loss (° C.) | (d) Impurity content (ppm) |
|---|---|---|---|---|---|---|---|
| Example 5 | Coagulated particles*¹ | 10-20 | 0.53 | 0.88 | 0.21 | 221 | 100 |
| Example 6 | Non-coagulated particles*² | 3-15 | 3.5 | 0.40 | 0.34 | 220 | — |
| Example 7 | Single crystal | 0.5-3 | — | 0.45 | — | — | — |

*¹Particles in Example 5 are secondary particles of coagulated principal particles having a particle diameter of 3 to 6 μm.

*²Particles (non-coagulated) in Example 6 are amorphous plate crystals with a maximum diagonal length of 3 to 15 μm.

TABLE 3

| | Gas generating composition | Composition ratio (wt. %) | Combustion temperature (K) | Gas output (mol/100 g) | Amount of CO generated (mol/100 g) | Amount of NO generated (mol/100 g) |
|---|---|---|---|---|---|---|
| Example 9 | BHTNH$_3$/BCN | 28.75/71.25 | 1835 | 2.43 | $1.3 \times 10^{-3}$ | $7.7 \times 10^{-5}$ |
| Example 10 | BHTK/BCN | 44.52/55.48 | 1889 | 1.54 | $1.38 \times 10^{-3}$ | $1.4 \times 10^{-4}$ |
| Example 11 | BHTNH$_3$/BCN/CMCNa | 24.9/72.1/3.0 | 1785 | 2.36 | $1.3 \times 10^{-3}$ | $7.7 \times 10^{-5}$ |
| Example 12 | BHTNH$_3$/BCN/CMCNa | 22.33/72.67/5 | 1764 | 2.32 | $1.27 \times 10^{-3}$ | $6.13 \times 10^{-5}$ |
| Example 13 | BHTNH$_3$/BCN/CMCNa | 19.77/73.23/7 | 1743 | 2.28 | $1.2 \times 10^{-3}$ | $4.84 \times 10^{-5}$ |
| Example 14 | BHTNH$_3$/BCN/CMCNa/Fe$_2$O$_3$ | 25.38/69.72/2.94/1.96 | 1732 | 2.38 | $1.7 \times 10^{-3}$ | $1.6 \times 10^{-5}$ |
| Example 15 | BHTNH$_3$/BCN/cellulose acetate | 22.79/74.21/3 | 1770 | 2.28 | $1.2 \times 10^{-3}$ | $6.4 \times 10^{-5}$ |
| Example 16 | Zn(5-AT)$_2$/BCN | 40/60 | 1878 | 2.04 | — | — |
| Example 17 | Zn(5-AT)$_2$/BCN/CMCNa | 35/62/3 | 1819 | 2.03 | — | — |
| Comparative Example 3 | BHTK/KNO$_3$ | 51.44/48.56 | 2393 | 1.26 | $5.1 \times 10^{-4}$ | $4.08 \times 10^{-3}$ |
| Comparative Example 4 | BHTNH$_3$/KNO$_3$/CMCNa | 30.97/66.03/3.0 | 2099 | 2.15 | $3.0 \times 10^{-3}$ | $1.2 \times 10^{-3}$ |

TABLE 4

| | Gas generating composition | Composition ratio (wt. %) | Friction sensitivity (kgf) | Drop hammer sensitivity (cm) |
|---|---|---|---|---|
| Example 18 | BHTNH$_3$/BCN | 28.75/71.25 | >36.0 | >100 |
| Example 19 | BHTK/BCN | 44.52/55.48 | >36.0 | 70-80 |
| Example 20 | BHTNH$_3$/BCN/CMCNa | 25.89/71.11/3 | >36.0 | >80 |
| Example 21 | NQ/BCN/CMCNa | 32/60/8 | >36.0 | >50 |
| Example 22 | NQ/BCN/guar gum | 44.2/52.8/3 | >36.0 | 60-70 |
| Example 23 | NQ/BCN/guar gum/KNO$_3$ | 45.0/47.0/3/5 | >36.0 | >100 |

TABLE 5

| | Gas generating composition | Composition ratio (wt. %) | Melting temperature (° C.) | Temperature at which to start thermal decomposition (° C.) | Temperature at which to start TG weight loss (° C.) |
|---|---|---|---|---|---|
| Example 24 | BHTNH$_3$/BCN | 28.75/71.25 | 208 | 230 | 216 |
| Example 25 | BHTK/BCN | 44.52/55.48 | 198 | 362 | 201 |
| Example 26 | NQ/BCN/CMCNa | 32/60/8 | — | 216.6 | 209.5 |
| Example 27 | NQ/BCN/CMCNa | 43.9/53.1/3 | — | 221.5 | 204.8 |
| Example 28 | Zn(5-AT)$_2$/BCN | 40/60 | — | 221.3 | 221.3 |

TABLE 6

| | Gas generating composition | Composition ratio (wt. %) | Burning rate (mm/sec) | Pressure index |
|---|---|---|---|---|
| Example 29 | BHTNH$_3$/BCN | 28.75/71.25 | 14.48 | 0.16 |
| Example 30 | BHTK/BCN | 44.52/55.48 | 27.92 | 0.20 |
| Example 31 | BHTNH$_3$/BCN/CMCNa | 25.89/71.11/3 | 14.99 | 0.15 |
| Example 32 | NQ/BCN/CMCNa | 28/64/8 | 7.9 | 0.33 |
| Example 33 | NQ/BCN/CMCNa | 30/62/8 | 8.9 | 0.29 |
| Example 34 | NQ/BCN/CMCNa | 32/60/8 | 9.7 | 0.44 |
| Example 35 | NQ/BCN/guar gum | 44.2/52.8/3 | 10.8 | 0.58 |
| Example 36 | NQ/BCN/guar gum/KNO$_3$ | 44.3/52.2/3/0.5 | 11.0 | 0.53 |
| Example 37 | NQ/BCN/guar gum/KNO$_3$ | 44.4/51.6/3/1 | 12.0 | 0.64 |
| Example 38 | NQ/BCN/guar gum/KNO$_3$ | 44.6/50.4/3/2 | 11.8 | 0.71 |
| Example 39 | NQ/BCN/guar gum/KNO$_3$ | 44.7/49.3/3/3 | 15.7 | 0.48 |
| Example 40 | NQ/BCN/guar gum/KNO$_4$ | 45.0/47.0/3/5 | 17.8 | 0.41 |

TABLE 7

| | Formulation | Composition ratio (wt. %) | NO$_2$ (ppm) | NO (ppm) | CO (ppm) | CO$_2$ (ppm) |
|---|---|---|---|---|---|---|
| Example 41 | NQ/BCN/CMCNa | 49.3/49.7/1 | 0 | 8 | 360 | 2200 |
| Example 42 | NQ/BCN/CMCNa | 47.1/50.9/2 | 0 | 12 | 320 | 2500 |
| Example 43 | NQ/BCN/CMCNa | 41.9/55.1/3 | 0 | 65 | 60 | 3000 |
| Example 44 | NQ/BCN/CMCNa | 42.9/54.1/3 | 0 | 55 | 110 | 2800 |
| Example 45 | NQ/BCN/CMCNa | 43.9/53.1/3 | 0 | 17 | 250 | 2500 |
| Example 46 | NQ/BCN/CMCNa | 44.9/52.1/3 | 0 | 12 | 340 | 3000 |
| Example 47 | NQ/BCN/CMCNa/Al(OH)$_3$ | 42.5/49.5/3/5 | 0 | 1 | 300 | 2600 |
| Example 48 | NQ/BCN/CMCNa/Al(OH)$_3$ | 40/47/3/10 | 0 | 0 | 240 | 2300 |
| Example 49 | NQ/BCN/CMCNa/Al(OH)$_3$ | 37.5/44.5/3/15 | 0 | 1 | 380 | 2100 |
| Example 50 | NQ/BCN/CMCNa/Al(OH)$_3$ | 35/42/3/20 | 0 | 3 | 160 | 2000 |
| Example 51 | NQ/BCN/CMCNa/Co(OH)$_2$ | 42.5/49.5/3/5 | 0 | 3 | 240 | 2600 |
| Example 52 | NQ/BCN/CMCNa/Co(OH)$_2$ | 40/47/3/10 | 0 | 0 | 180 | 2200 |
| Example 53 | NQ/BCN/CMCNa/Co(OH)$_2$ | 37.5/44.5/3/15 | 0 | 1 | 200 | 2200 |
| Example 54 | NQ/BCN/CMCNa/Co(OH)$_2$ | 35/42/3/20 | 0 | 1 | 180 | 2000 |
| Example 55 | NQ/BCN/CMCNa/Japanese acid clay | 42.5/49.5/3/5 | 0 | 0 | 290 | 2100 |
| Example 56 | NQ/BCN/CMCNa/mica | 42.5/49.5/3/5 | 0 | 0 | 290 | 2100 |
| Example 57 | NQ/BCN/CMCNa/CaCO$_3$ | 42.5/49.5/3/5 | 0 | 5 | 270 | 2200 |
| Example 58 | NQ/BCN/CMCNa/Al$_2$O$_3$ | 42.5/49.5/3/5 | 0 | 2 | 310 | 2900 |
| Example 59 | NQ/BCN/CMCNa/SiO$_2$ | 42.5/49.5/3/5 | 0 | 1 | 310 | 2100 |
| Example 60 | NQ/BCN/guar gum | 44.2/52.8/3 | 0 | 8 | 410 | 2500 |
| Example 61 | NQ/BCN/guar gum/KNO$_3$ | 44.4/51.6/3/1 | 0 | 5 | 320 | 2000 |
| Example 62 | NQ/BCN/guar gum/KNO$_3$ | 44.7/49.3/3/3 | 0 | 1 | 350 | 1900 |
| Example 63 | NQ/BCN/guar gum/KNO$_3$ | 45.0/47.0/3/5 | 0 | 3 | 320 | 2000 |

TABLE 8

| | Formulation | Composition ratio (wt. %) | NO$_2$ (ppm) | NO (ppm) | CO (ppm) | CO$_2$ (ppm) |
|---|---|---|---|---|---|---|
| Example 64 | BHTNH$_3$/BCN/CMCNa | 24.89/72.11/3 | 0 | 32 | 220 | 2200 |
| Example 65 | BHTNH$_3$/BCN/CMCNa | 25.89/71.11/3 | 0 | 12 | 330 | 2000 |
| Example 66 | BHTNH$_3$/BCN/CMCNa | 26.89/70.11/3 | 0 | 10 | 400 | 1950 |
| Example 67 | BHTNH$_3$/BCN/CMCNa/Fe$_2$O$_3$ | 23.61/68.39/3/5 | 0 | 22 | 240 | 2050 |
| Example 68 | BHTNH$_3$/BCN/CMCNa/Fe$_2$O$_3$ | 23.78/53.22/3/20 | 0 | 5 | 180 | 1100 |
| Example 69 | BHTNH$_3$/BCN/CMCNa/CuO | 24.00/53.00/3/20 | 0 | 19 | 280 | 1500 |
| Example 70 | BHTNH$_3$/BCN/CMCNa/Co$_3$O$_4$ | 24.78/67.22/3/5 | 0 | 10 | 200 | 1900 |
| Example 71 | BHTNH$_3$/BCN/CMCNa/Co$_3$O$_4$ | 24.75/62.25/3/10 | 0 | 6 | 220 | 1600 |
| Example 72 | BHTNH$_3$/BCN/CMCNa/Co$_3$O$_4$ | 23.51/53.49/3/20 | 0 | 2 | 210 | 1800 |
| Example 73 | BHTNH$_3$/BCN/CMCNa/MnO$_2$ | 26.87/60.13/3/10 | 0 | 8 | 360 | 1800 |
| Example 74 | BHTNH$_3$/BCN/CMCNa/Co(OH)$_2$ | 20.24/56.76/3/20 | 0 | 7 | 110 | 1800 |
| Example 75 | BHTNH$_3$/BCN/CMCNa/Co(OH)$_2$ | 23.24/53.76/3/20 | 0 | 2 | 190 | 1700 |
| Example 76 | BHTNH$_3$/BCN/CMCNa/Al(OH)$_3$ | 24.24/52.76/3/20 | 0 | 11 | 180 | 1900 |
| Example 77 | BHTNH$_3$/BCN/CMCNa/Al(OH)$_3$ | 25.12/61.88/3/10 | 0 | 4 | 190 | 1600 |
| Example 78 | BHTNH$_3$/BCN/CMCNa/CaCO$_3$ | 22.24/54.76/3/20 | 0 | 20 | 190 | 1700 |
| Example 79 | BHTNH$_3$/BCN/HPC/Co(OH)$_2$ | 23.13/55.87/1/20 | 0 | 5 | 130 | 1600 |
| Example 80 | BHTNH$_3$/BCN/HPC/Al(OH)$_3$ | 23.13/55.87/1/20 | 0 | 22 | 60 | 1700 |
| Example 81 | BHTNH$_3$/BCN/CMCNa/CoCO$_3$ | 22.24/54.76/3/20 | 0 | 1 | 200 | 2000 |
| Example 82 | BHTNH$_3$/BCN/CMCNa/basic zinc carbonate | 22.24/54.76/3/20 | 0 | 3 | 200 | 1800 |
| Example 83 | BHTNH$_3$/BCN/CMCNa/basic copper carbonate | 24.80/52.20/3/20 | 0 | 12 | 220 | 2000 |

TABLE 9

| | Formulation | Composition ratio (wt. %) | Combustion temperature (K) | Gas output (mol/100 g) |
|---|---|---|---|---|
| Example 84 | NQ/BCN/guar gum | 44.2/52.8/3 | 2168 | 2.76 |
| Example 85 | NQ/BCN/guar gum | 45.2/51.8/3 | 2156 | 2.80 |
| Example 86 | NQ/BCN/guar gum | 46.2/50.8/3 | 2145 | 2.84 |
| Example 87 | NQ/BCN/guar gum | 41.9/54.1/4 | 2131 | 2.72 |
| Example 88 | NQ/BCN/guar gum | 42.8/53.2/4 | 2121 | 2.76 |
| Example 89 | NQ/BCN/guar gum | 43.8/52.2/4 | 2110 | 2.80 |
| Example 90 | NQ/BCN/guar gum | 39.5/55.5/5 | 2096 | 2.69 |
| Example 91 | NQ/BCN/guar gum | 40.5/54.5/5 | 2084 | 2.73 |
| Example 92 | NQ/BCN/guar gum | 41.5/53.5/5 | 2073 | 2.77 |
| Example 93 | NQ/BCN/guar gum | 37.1/56.9/6 | 2059 | 2.65 |
| Example 94 | NQ/BCN/guar gum | 38.1/55.9/6 | 2048 | 2.69 |
| Example 95 | NQ/BCN/guar gum | 39.1/54.9/6 | 2036 | 2.73 |
| Example 96 | NQ/BCN/guar gum/KNO$_3$ | 44.3/52.2/3/0.5 | 2167 | 2.76 |
| Example 97 | NQ/BCN/guar gum/KNO$_3$ | 44.4/51.6/3/1 | 2165 | 2.76 |
| Example 98 | NQ/BCN/guar gum/KNO$_3$ | 44.5/51.0/3/1.5 | 2164 | 2.76 |
| Example 99 | NQ/BCN/guar gum/KNO$_3$ | 44.6/50.4/3/2 | 2163 | 2.76 |
| Example 100 | NQ/BCN/guar gum/KNO$_3$ | 44.7/49.3/3/3 | 2162 | 2.75 |
| Example 101 | NQ/BCN/guar gum/KNO$_3$ | 44.9/48.1/3/4 | 2160 | 2.75 |
| Example 102 | NQ/BCN/guar gum/KNO$_3$ | 45.0/47.0/3/5 | 2159 | 2.75 |

TABLE 10

| | Formulation and composition ratio (wt. %) | Burning rate (mm/sec) | Pressure index | Combustion temperature (k) | Gas output | Heat content (cal/g) | Amount of CO generated (mol/100 g) | Amount of NO generated (mol/100 g) |
|---|---|---|---|---|---|---|---|---|
| Ex. 104 | NQ/BCN/guar gum/SiO$_2$ = 43.7/52.3/3/1 | 12.30 | 0.35 | 2156 | 2.73 | 698 | 0.0495 | 2.05E−4 |
| Ex. 105 | NQ/BCN/guar gum/SiO$_2$ = 43.2/51.8/3/2 | 12.88 | 0.31 | 2145 | 2.70 | 693 | 0.0492 | 1.81E−4 |
| Ex. 106 | NQ/BCN/guar gum/SiO$_2$ = 42.7/51.3/3/3 | 13.11 | 0.32 | 2136 | 2.66 | 687 | 0.0417 | 1.92E−4 |
| Ex. 107 | NQ/BCN/guar gum/SiO$_2$ = 42.2/50.8/3/4 | 13.83 | 0.29 | 2122 | 2.65 | 681 | 0.0486 | 1.40E−4 |
| Ex. 108 | NQ/BCN/guar gum/SiO$_2$ = 41.7/50.3/3/5 | 13.61 | 0.31 | 2110 | 2.62 | 676 | 0.0483 | 1.23E−4 |
| Ex. 109 | NQ/BCN/guar gum/SiO$_2$ = 40.7/49.3/3/7 | 13.68 | 0.22 | 2087 | 2.56 | 664 | 0.0477 | 7.23E−5 |
| Ex. 110 | NQ/BCN/guar gum/SiO$_2$ = 39.8/48.2/3/9 | 14.45 | 0.23 | 2062 | 2.51 | 653 | 0.0495 | 6.78E−4 |
| Ex. 111 | NQ/BCN/guar gum/SiO$_2$ = 38.8/47.2/3/11 | 13.71 | 0.22 | 2038 | 2.45 | 641 | 0.0489 | 5.12E−5 |

What is claimed is:

1. A molded single-perforated cylinder article having high thermal stability, wherein said molded article is a gas generating composition comprising:
   (a) 32 weight-% nitroguanidine as a fuel,
   (b) 60 weight-% basic copper nitrate as an oxidizing agent, and
   (c) 8 weight-% sodium carboxymethylcellulose as a binder.

2. A molded single-perforated cylinder article having high thermal stability, wherein said molded article is a gas generating composition comprising:
   (a) 44.2 weight-% nitroguanidine as a fuel,
   (b) 52.8 weight-% basic copper nitrate as an oxidizing agent, and
   (c) 3 weight-% guar gum as a binder.

* * * * *